(12) United States Patent
Onda et al.

(10) Patent No.: US 10,964,005 B2
(45) Date of Patent: Mar. 30, 2021

(54) OPERATION ANALYSIS APPARATUS, OPERATION ANALYSIS METHOD, OPERATION ANALYSIS PROGRAM, AND OPERATION ANALYSIS SYSTEM

(71) Applicant: OMRON Corporation, Kyoto (JP)

(72) Inventors: Hiroomi Onda, Kyoto (JP); Shuichi Goto, Kyoto (JP); Naohiro Kawai, Kyoto (JP); Jun Sasaki, Kyoto (JP)

(73) Assignee: OMRON Corporation, Kyoto (JP)

( * ) Notice: Subject to any disclaimer, the term of this patent is extended or adjusted under 35 U.S.C. 154(b) by 179 days.

(21) Appl. No.: 16/387,656

(22) Filed: Apr. 18, 2019

(65) Prior Publication Data

US 2019/0347779 A1 Nov. 14, 2019

(30) Foreign Application Priority Data

May 14, 2018 (JP) .............................. JP2018-093277

(51) Int. Cl.
*G06T 7/00* (2017.01)
*G06T 7/50* (2017.01)
*G06T 7/70* (2017.01)
*G06K 9/00* (2006.01)
(Continued)

(52) U.S. Cl.
CPC ........ *G06T 7/0002* (2013.01); *G06K 9/00369* (2013.01); *G06K 9/628* (2013.01); *G06T 7/20* (2013.01); *G06T 7/50* (2017.01); *G06T 7/70* (2017.01); *G06T 2207/30196* (2013.01)

(58) Field of Classification Search
CPC ................................ G08B 21/10; G16H 40/67
See application file for complete search history.

(56) References Cited

U.S. PATENT DOCUMENTS

| 2011/0022432 A1* | 1/2011 | Ishida | ............... G06Q 10/06398 |
| | | | 705/7.42 |
| 2013/0230211 A1* | 9/2013 | Tanabiki | .................. G06T 7/75 |
| | | | 382/103 |

(Continued)

FOREIGN PATENT DOCUMENTS

JP 2009-122302 A 6/2009

OTHER PUBLICATIONS

Extended European search report dated Oct. 2, 2019 in a counterpart European patent application.

*Primary Examiner* — Manuchehr Rahmjoo
(74) *Attorney, Agent, or Firm* — Metrolex IP Law Group, PLLC

(57) ABSTRACT

An operation analysis apparatus includes: an acquisition unit configured to acquire a plurality of pieces of operation information indicating operations of a plurality of persons to be analyzed; a classification unit configured to classify the plurality of pieces of operation information into a plurality of groups; and an analysis unit configured to analyze the operations of the persons to be analyzed based on the pieces of operation information that have been classified into the plurality of groups. The plurality of pieces of operation information each include skeleton information that indicates positions of a plurality of body parts that are associated with the skeleton of each of the plurality of persons to be analyzed, and the classification unit classifies the plurality of pieces of operation information using the skeleton information included in the operation information.

17 Claims, 17 Drawing Sheets

(51) Int. Cl.
*G06K 9/62* (2006.01)
*G06T 7/20* (2017.01)

(56) References Cited

U.S. PATENT DOCUMENTS

2014/0051515 A1 2/2014 Geiss
2015/0310629 A1* 10/2015 Utsunomiya ...... G06K 9/00348
382/107

* cited by examiner

OPERATION ANALYSIS APPARATUS, OPERATION ANALYSIS METHOD, OPERATION ANALYSIS PROGRAM, AND OPERATION ANALYSIS SYSTEM

CROSS-REFERENCES TO RELATED APPLICATIONS

This application claims priority to Japanese Patent Application No. 2018-093277 filed May 14, 2018, the entire contents of which are incorporated herein by reference.

FIELD

The present disclosure relates to an operation analysis apparatus, an operation analysis method, an operation analysis program, and an operation analysis system.

BACKGROUND

Heretofore, there have been cases where operations of a person to be analyzed are analyzed by capturing the person to be analyzed using a camera and performing image processing on the captured image, and by measuring operations of a person to be analyzed through motion capturing and performing signal processing on the measured signals.

For example, JP 2009-122302A describes a task information processing apparatus including a storage unit for storing detection information for specifying a detection value of a sensor that detects operations, operation dictionary information for specifying an operation corresponding to the detection information, combination information for specifying a combination of operations in time series, and task dictionary information for specifying a task corresponding to the combination information, and a control unit. Here, the control unit performs processing for specifying an operation corresponding to a detection value detected by the sensor possessed by an operator from the operation dictionary information, processing for specifying a combination of specified operations in time series, and specifying a task corresponding to the specified combination from the task dictionary information, and processing for generating task information for specifying operations and tasks, in time series, for each operator.

JP 2009-122302A is an example of background art.

SUMMARY

Sometimes, there are requests such as that, when various tasks are performed in a manufacturing line, the proficiency of a person to be analyzed is evaluated, and whether the person to be analyzed is not performing a non-standard operation is confirmed. In order to meet such requests, a camera and a sensor are installed in the manufacturing line, and operations of the person to be analyzed are continuously measured. For example, according to the technique described in JP 2009-122302A, an operation of an operator and a corresponding task are specified for each operator using operation dictionary information and task dictionary information that are stored in advance.

However, because the operations of persons differ from person to person, even if pieces of information indicating respective operations of a plurality of persons to be analyzed are measured, correct analysis may not be performed, or an analysis result with low accuracy may be obtained, if these pieces of information are analyzed based on the same information such as dictionary information. Such a problem may occur, without being limited to the case where tasks are performed in a manufacturing line, when a person performs any motions such as motions in sports.

Therefore, one or more aspects aim to provide an operation analysis apparatus, an operation analysis method, an operation analysis program, and an operation analysis system with which operations of a person to be analyzed can be analyzed with high accuracy.

An operation analysis apparatus according to one or more aspects of this disclosure includes: an acquisition unit configured to acquire a plurality of pieces of operation information indicating operations of a plurality of persons to be analyzed;

a classification unit configured to classify the plurality of pieces of operation information into a plurality of groups; and an analysis unit configured to analyze the operations of the persons to be analyzed based on the pieces of operation information that have been classified into the plurality of groups. The plurality of pieces of operation information each include skeleton information that indicates positions of a plurality of body parts that are associated with a skeleton of each of the plurality of persons to be analyzed, and the classification unit classifies the plurality of pieces of operation information using the skeleton information included in the operation information. Here, the operation information may be a still image or a moving image that is captured by a camera and includes an image of a person to be analyzed. Also, the operation information may be, instead of an image of a person to be analyzed itself, information obtained by modelling a physical feature such as the skeleton of the person to be analyzed using motion capturing or the like. The operation information may be time series information indicating the course of operations of a person to be analyzed, for example, but the operation information need not be time series information. The plurality of body parts that are associated with the skeleton of a person to be analyzed may be any parts such as joints, a head, shoulders, and a waist of a person to be analyzed. The plurality of body parts that are associated with the skeleton of a person to be analyzed need not be a plurality of body parts that are directly associated with bones, and may be a plurality of body parts whose positions are determined by the skeleton such as a fingertip, a tip of the nose, and an ear lobe. That is, the skeleton information may include information indicating the positions of a plurality of body parts that are directly associated with bones, and information indicating the positions of a plurality of body parts whose positions are determined by the skeleton.

According to one or more aspects, a plurality of pieces of operation information is classified using skeleton information, and operations are analyzed based on the classification result. With this, a person to be analyzed can be analyzed according to the physical feature such as their skeletons. Accordingly, an operation of a person to be analyzed can be analyzed with high accuracy, compared with a case where the operation of the person to be analyzed is similarly analyzed regardless of the physical feature of the person.

In one or more aspects, the classification unit may classify the plurality of pieces of operation information into the plurality of groups based on a difference between the skeleton information included in one operation information of the plurality of pieces of operation information and the skeleton information included in another operation information of the plurality of pieces of operation information. Here, the difference in skeleton information may be difference in positions of a plurality of body parts of a person to be analyzed indicated by the skeleton information. Specifically, the difference between the skeleton information included in operation information of one person to be analyzed and the skeleton information included in operation information of another person to be analyzed may be difference between the positions of a plurality of body parts of the one person to be analyzed and the positions of the corresponding plurality of body parts of the other person to be analyzed.

According to one or more aspects, as a result of classifying a plurality of pieces of operation information into a plurality of groups based on the difference in skeleton information, pieces of operation information can be classified into groups based on the difference in body build of the persons to be analyzed, and pieces of operation information of persons to be analyzed who have a similar body build can be classified into one group. Accordingly, the operation of a person to be analyzed can be analyzed by performing comparison with operations of persons to be analyzed who have similar body build.

In one or more aspects, the classification unit classifies the plurality of pieces of operation information into the plurality of groups based on a difference between the skeleton information included in the operation information and a predetermined reference information. Here, the predetermined reference information may be information that can be compared with positions of a plurality of body parts, and may be information indicating a range of an operation region, for example.

According to one or more aspects, as a result of classifying a plurality of pieces of operation information into a plurality of groups based on the difference between skeleton information and predetermined reference information, pieces of operation information can be classified into groups based on the reference information, and pieces of operation information of persons to be analyzed who have a similar property with respect to the reference information can be classified into one group. Accordingly, the operation of a person to be analyzed can be analyzed by performing comparison with operations of persons to be analyzed who have a similar property with respect to the reference information.

In one or more aspects, the skeleton information may include coordinate values of a plurality of nodes corresponding to the plurality of parts, and the classification unit may classify the plurality of pieces of operation information into the plurality of groups by performing classification based on a distance between the plurality of nodes that is calculated based on the coordinate values. Here, the plurality of nodes may be nodes in a skeleton model corresponding to the plurality of body parts that have been associated with the skeleton of the person to be analyzed, and the distances between a plurality of nodes may be lengths of edges in the skeleton model. Here, the skeleton model may be a model indicating the outline of the body build of the person to be analyzed using a plurality of edges and a plurality of nodes. The outline of the skeleton of the person to be analyzed may be indicated by the plurality of edges, and the end points and the connection points of the plurality of edges may be indicated by the plurality of nodes.

According to one or more aspects, as a result of classifying a plurality of pieces of operation information into a plurality of groups based on the distance between a plurality of nodes, pieces of operation information can be classified into groups based on the difference in body build of the persons to be analyzed, and persons to be analyzed who have a similar body build can be classified into one group. Accordingly, the operation of a person to be analyzed can be analyzed by performing comparison with operations of persons to be analyzed who have a similar body build.

In one or more aspects, the classification unit may classify the plurality of pieces of operation information into the plurality of groups by performing classification based on a distance between two adjacent nodes of the plurality of nodes.

According to one or more aspects, as a result of classifying a plurality of pieces of operation information into a plurality of groups based on the distance between two adjacent nodes of a plurality of nodes, pieces of operation information can be classified into groups based on the length that is unique to each person to be analyzed, and the operation of a person to be analyzed can be analyzed while accurately recognizing the physical feature of the person to be analyzed.

In one or more aspects, the classification unit may classify the plurality of pieces of operation information into the plurality of groups based on a ratio between a distance between two adjacent nodes of the plurality of nodes and a distance between two other adjacent nodes of the plurality of nodes.

According to one or more aspects, as a result of classifying a plurality of pieces of operation information into a plurality of groups based on the ratio between the distance between two adjacent nodes of a plurality of nodes and the distance between two other adjacent nodes, the pieces of operation information can be classified into groups based on an amount that is unique to each person to be analyzed and is independent of the measurement units, and the operation of a person to be analyzed can be analyzed while accurately recognizing the physical feature of the person to be analyzed.

In one or more aspects, the classification unit may classify the plurality of pieces of operation information into the plurality of groups based on a ratio between a distance between a plurality of nodes and a reference distance that is acquired by the acquisition unit along with the plurality of pieces of operation information. Here, the reference distance is a distance that can be compared with the distance between two adjacent nodes, and may be the length of a specific tool used by an operator, or the length of a specific marker provided in an operation region, for example.

According to one or more aspects, as a result of classifying a plurality of pieces of operation information into a plurality of groups based on the ratio between the distance between two adjacent nodes of a plurality of nodes and a reference distance, the pieces of operation information can be classified into groups based on an amount that is unique to each person to be analyzed and is independent of the measurement units, and the operation of a person to be analyzed can be analyzed while accurately recognizing the physical feature of the person to be analyzed.

In one or more aspects, the coordinate values are associated with time instants at which the coordinate values are measured, and the classification unit may classify the plurality of pieces of operation information into the plurality of groups based on an average distance between the plurality of nodes that is calculated based on the plurality of coordinate values that are measured at different time instants.

According to one or more aspects, as a result of classifying a plurality of pieces of operation information into a plurality of groups based on the distance between a plurality of nodes that can be calculated based on three-dimensional coordinate values, the pieces of operation information can be accurately classified into groups based on the difference in body build of persons to be analyzed, and an operation of a person to be analyzed can be analyzed by comparing the operation with the operations of persons to be analyzed whose body builds are similar to that of the person to be analyzed.

In one or more aspects, the coordinate values are associated with time instants at which the coordinate values are measured, and the classification unit may classify the plurality of pieces of operation information into the plurality of groups based on an average distance between the plurality of nodes that is calculated based on the plurality of coordinate values that are measured at different time instants.

According to one or more aspects, as a result of classifying a plurality of pieces of operation information into a plurality of groups based on an average distance between a plurality of nodes obtained by performing measurement at different time instants, the pieces of operation information can be classified into groups while reducing influence of errors in the measurement of coordinate values of nodes, and an operation of a person to be analyzed can be accurately analyzed by comparing the operation with the operations of persons to be analyzed whose body builds are similar to that of the person to be analyzed.

In one or more aspects, the operation analysis apparatus may further include a selection unit configured to select a plurality of parts, of the plurality of parts, that are used for classification performed by the classification unit.

According to one or more aspects, a plurality of parts that well represents the physical feature of a person to be analyzed can be selected, and pieces of operation information are classified into groups in order to accurately recognize the physical feature of the person to be analyzed, and as a result, the operation of the person to be analyzed can be analyzed with high accuracy.

In one or more aspects, the selection unit may select each of a plurality of parts that are used for classification performed by the classification unit based on whether or not the part is acquired from the plurality of persons to be analyzed in common.

According to one or more aspects, as a result of selecting parts whose positions are acquired from a plurality of persons to be analyzed in common as the parts to be used when the classification unit performs classification, the physical features of the plurality of persons to be analyzed can be classified based on the parts in common, pieces of operation information can be classified into groups such that the physical feature of a person to be analyzed can be accurately recognized, and the operation of the person to be analyzed can be analyzed with high accuracy.

In one or more aspects, the selection unit may select parts that are used for classification performed by the classification unit based on comparison between a distance between two adjacent parts of the plurality of parts and a distance between two other adjacent parts of the plurality of parts.

According to one or more aspects, by comparing the distance between two adjacent parts of the plurality of parts with the distance between two other adjacent parts of the plurality of parts, the parts to be used when the classification unit performs classification can be selected such that the relative error when the positions are measured decreases, and the operation of a person to be analyzed can be analyzed with high accuracy by classifying pieces of operation information into groups such that the physical feature of a person to be analyzed can be accurately recognized.

In one or more aspects, the selection unit may select a content for the person to be analyzed based on an analysis result of the analysis unit. Here, the contents may be any information such as a moving image, an image, or a text, and may be a moving image showing an operation that serves as a model, or information regarding an instrument for making an operation smooth.

According to one or more aspects, improvement in operation of a person to be analyzed can be accelerated by recommending, based on the analysis result, contents regarding an instrument that the person to be analyzed should refer to, and by recommending contents regarding operations that the person to be analyzed should refer to.

In one or more aspects, the analysis unit may analyze whether or not an anomaly is included in an operation of the person to be analyzed based on a feature amount that is calculated based on the operation information and represents a feature of the operation of the person to be analyzed. Here, the feature amount representing the feature of the operation of the person to be analyzed is a numerical value with which the feature of the operation of the person to be analyzed can be characterized, and may be an operation time or a length of a locus of a specific part of the person to be analyzed when performing the operation. Here, the operation time may be a length of time from when the person to be analyzed has started the operation until the end of the operation.

According to one or more aspects, pieces of operation information of persons to be analyzed are classified into groups considering the body builds of the persons to be analyzed, and the feature amounts representing the operations of persons to be analyzed that belong to the same group are compared, and as a result, whether or not the operation of the person to be analyzed has an anomaly relative to the operations of other persons to be analyzed who have a similar body build can be analyzed, and whether or not an anomaly is present in the operation of the person to be analyzed can be analyzed with high accuracy.

In one or more aspects, the analysis unit may analyze proficiency in an operation of the person to be analyzed based on a feature amount that is calculated based on the operation information and represents a feature of the operation of the person to be analyzed. Here, the proficiency in an operation of a person to be analyzed may be an index for evaluating the speed and correctness of a predetermined operation performed by the person to be analyzed, and may be expressed by a rate at which the operation time decreases with respect to the number of executions of a predetermined operation, for example. Also, the proficiency may also simply be an operation time.

According to one or more aspects, the operations of persons to be analyzed are classified into groups considering the body builds of the persons to be analyzed, and the feature amounts representing the features of the operations of persons to be analyzed who belong to the same group are extracted, and as a result, the proficiency in the operation of persons to be analyzed who have a similar body build can be analyzed, and the proficiency in the operation of the person to be analyzed can be analyzed at high accuracy.

In one or more aspects, the feature amount may include at least one of a length of a locus of a specific part of the person to be analyzed and an operation time of the person to be analyzed.

According to one or more aspects, as a result of the operations of persons to be analyzed being classified into groups considering the body builds of the persons to be analyzed, and at least one of the length of a locus of a specific part of a person to be analyzed and the operation time of the person to be analyzed being compared with those of persons to be analyzed belonging to the same group, the operation of the person to be analyzed can be analyzed with high accuracy.

An operation analysis method according to one or more aspects of this disclosure includes: acquiring a plurality of pieces of operation information indicating operations of a plurality of persons to be analyzed; classifying the plurality of pieces of operation information into a plurality of groups; and analyzing the operations of the persons to be analyzed based on the pieces of operation information that have been classified into the plurality of groups. The plurality of pieces of operation information each include skeleton information that indicates positions of a plurality of body parts that are associated with the skeleton of each of the plurality of persons to be analyzed, and the classifying includes classifying the plurality of pieces of operation information using the skeleton information included in the operation information. The skeleton information may be skeleton information.

According to one or more aspects, a plurality of pieces of operation information are classified into groups using skeleton information, and operations are analyzed based on the classification result. With this, an analysis can be performed on persons to be analyzed according to physical features such as their skeletons. Therefore, the operation performed by a person to be analyzed can be analyzed with high accuracy compared with a case where the operation of the person to be analyzed is similarly analyzed regardless of the physical feature of the person.

An operation analysis program according to one or more aspects of this disclosure causes a computation unit included in an operation analysis apparatus to function as: an acquisition unit configured to acquire a plurality of pieces of operation information indicating operations of a plurality of persons to be analyzed; a classification unit configured to classify the plurality of pieces of operation information into a plurality of groups; and an analysis unit configured to analyze the operations of the persons to be analyzed based on the pieces of operation information that have been classified into the plurality of groups. The plurality of pieces of operation information each include skeleton information that indicates positions of a plurality of body parts that are associated with the skeleton of each of the plurality of persons to be analyzed, and the classification unit classifies the plurality of pieces of operation information using the skeleton information included in the operation information.

According to one or more aspects, a plurality of pieces of operation information are classified into groups using skeleton information, and operations are analyzed based on the classification result. With this, an analysis can be performed on persons to be analyzed according to physical features such as their skeletons. Therefore, the operation performed by a person to be analyzed can be analyzed with high accuracy compared with a case where the operation of the person to be analyzed is similarly analyzed regardless of the physical feature of the person.

An operation analysis system according to one or more aspects of this disclosure includes: a measurement unit configured to acquire a plurality of pieces of operation information indicating operations of a plurality of persons to be analyzed; a classification unit configured to classify the plurality of pieces of operation information into a plurality of groups; an analysis unit configured to analyze the operations of the persons to be analyzed based on the pieces of operation information that have been classified into the plurality of groups; and a display unit configured to display an analysis result of the analysis unit. The plurality of pieces of operation information each include skeleton information that indicates positions of a plurality of body parts that are associated with the skeleton of each of the plurality of persons to be analyzed, and the classification unit classifies the plurality of pieces of operation information using the skeleton information included in the operation information.

According to one or more aspects, a plurality of pieces of operation information are classified into groups using skeleton information, and operations are analyzed based on the classification result. With this, an analysis can be performed on persons to be analyzed according to physical features such as their skeletons. Therefore, the operation performed by a person to be analyzed can be analyzed with high accuracy compared with a case where the operation of the person to be analyzed is similarly analyzed regardless of the physical feature of the person.

According to one or more aspects, an operation analysis apparatus, an operation analysis method, an operation analysis program, and an operation analysis system are provided with which operations of a person to be analyzed can be analyzed with high accuracy.

DETAILED DESCRIPTION

Hereinafter, one or more embodiments according to one or more aspects (hereinafter, referred to as "one or more embodiments") will be described based on the drawings. Note that constituent elements having the same or similar configurations are denoted by the same reference signs.

1. Application Example

Figure 1:
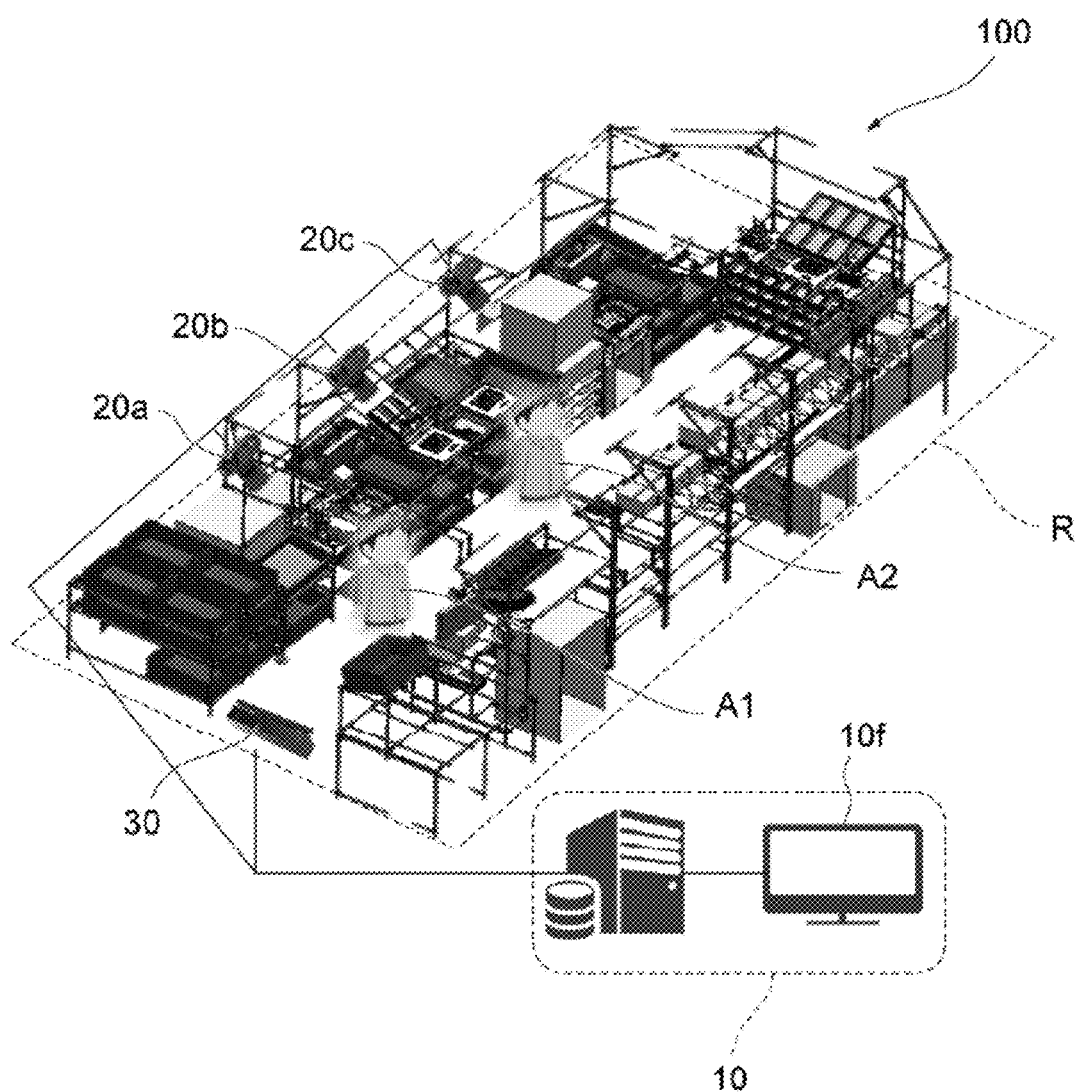
FIG. 1 is a diagram illustrating an outline of an operation analysis system according to one or more embodiments.

First, an example of a situation in which one or more embodiments is applied will be described using FIGS. 1 to 3. FIG. 1 is a diagram illustrating an outline of an operation analysis system 100 according to one or more embodiments. The operation analysis system 100 includes an operation analysis apparatus 10, and the operation analysis apparatus 10 is an information processing apparatus for analyzing operations of a person to be analyzed. Here, the person to be analyzed is a person with respect to which analysis is performed, and may differ for different types of analysis. For example, when the operations of an operator at a manufacturing site are analyzed by the operation analysis apparatus 10, the person to be analyzed is the operator. In one or more embodiments, a case will be described in which the operations of an operator at a production site are analyzed by the operation analysis apparatus 10. Of course, the person to be analyzed with respect to which analysis is performed may be a person other than operators at a manufacturing site, and may be a person who performs a sport, or a person who performs any operation. The person to be analyzed may also be a person having a specific part, such as an arm, a leg, or a finger, that is defective.

The operation analysis system 100 according to one or more embodiments includes a measurement unit 30 that measures pieces of operation information indicating respective operations of a first operator A1 and a second operator A2, and a first image capturing unit 20a, a second image capturing unit 20b, and a third image capturing unit 20c that capture a moving image, which is a type of the operation information. The operation information may include skeleton information indicating positions of a plurality of body parts that are associated with a skeleton of the first operator A1 or the second operator A2. Here, the plurality of body parts that are associated with the skeleton of a person to be analyzed may be any parts of the person to be analyzed, such as a joint, a head, a shoulder, and a waist. Note that the plurality of body parts that are associated with the skeleton of a person to be analyzed need not be a plurality of body parts that are directly related to bones, and may be a plurality of body parts whose positions are determined by the skeleton, such as a fingertip, a tip of the nose, and an ear lobe. That is, the skeleton information may include information indicating positions of a plurality of body parts that are directly related to the bones, and information indicating positions of a plurality of body parts whose positions are determined by the skeleton. The measurement unit 30 may be constituted by a motion capturing device, and may measure operation information including coordinate values of a plurality of nodes corresponding to a plurality of body parts that are associated with the skeletons of the first operator A1 and the second operator A2 when performing operations in an operation region R. Also, the first, second, and third image capturing units 20a, 20b, and 20c may be constituted by general purpose cameras, and may capture moving images including scenes in which the first operator A1 and the second operator A2 perform operations in the operation region R. The operation information may be information including coordinate values of a plurality of nodes corresponding to parts (such as a joint, a head, a shoulder, and a waist) that represent physical features of the first and second operators A1 and A2, or may be moving images indicating positions of a plurality of body parts that are associated with the skeletons of the first and second operators A1 and A2.

The operation information may be still images or moving images including a person to be analyzed that are captured by cameras such as the first, second, and third image capturing units 20a, 20b, and 20c. Also, the operation information need not be an image of a person to be analyzed itself, and may be information obtained by modeling a physical feature of the skeleton or the like of a person to be analyzed using a motion capturing apparatus such as the measurement unit 30. The operation information is time series information indicating the course of operations of a person to be analyzed, for example, but need not be time series information.

The operation analysis system 100 according to one or more embodiments is for analyzing operations performed by a person to be analyzed in the operation region R including the entirety of the manufacturing line, but the operation region R may also be any region such as a region in which a predetermined process is to be performed, or a region in which a predetermined elementary operation is to be performed. Here, an "elementary operation" is one unit of operation to be performed by a person to be analyzed, and operations such as picking components, arranging components, fixing components, packing products, screw fastening, and inspection are examples of elementary operations.

Figure 2:
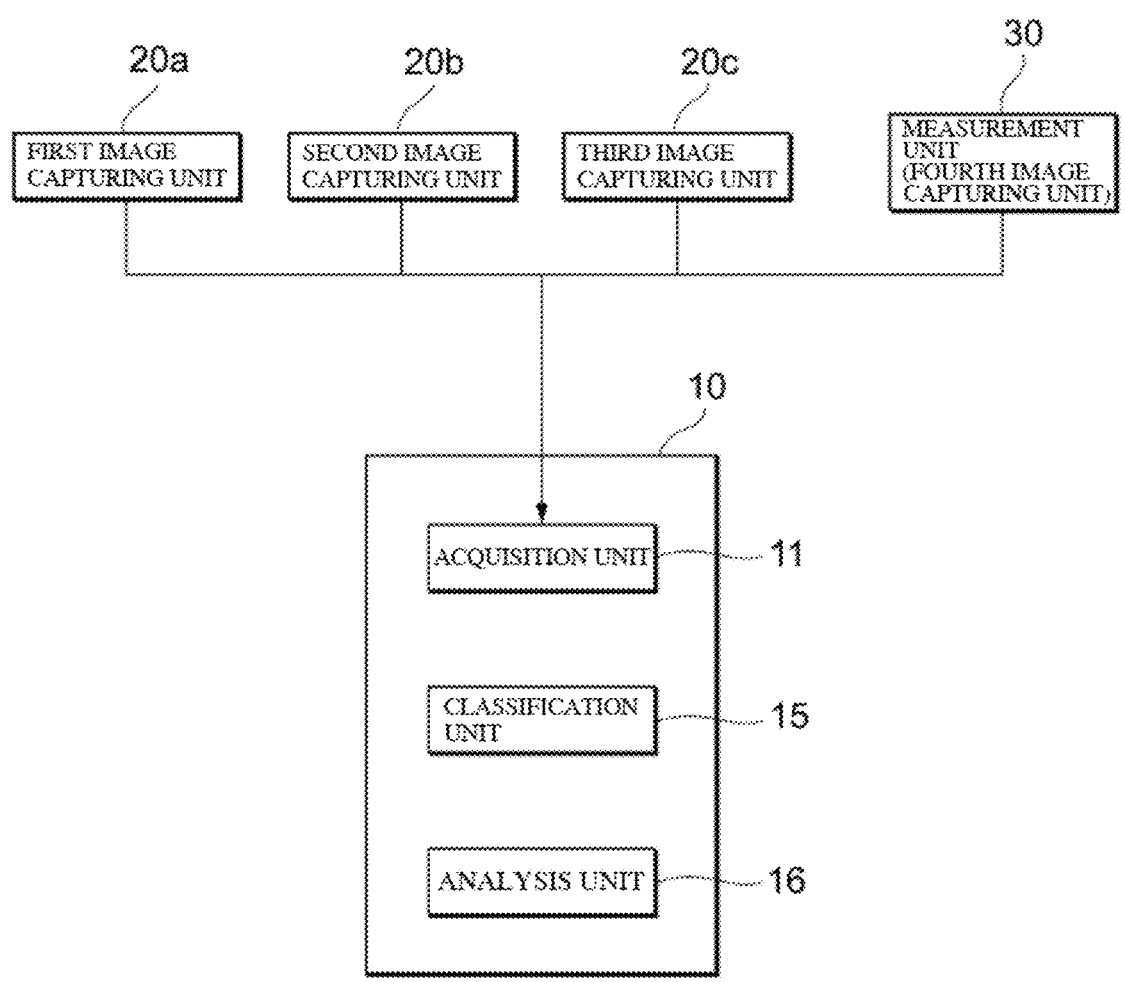
FIG. 2 is a diagram illustrating main functional blocks of an operation analysis apparatus according to one or more embodiments.

FIG. 2 is a diagram illustrating main functional blocks of the operation analysis apparatus 10 according to one or more embodiments. The operation analysis apparatus 10 according to one or more embodiments mainly includes an acquisition unit 11 that acquires a plurality of pieces of operation information indicating operations of a plurality of persons to be analyzed, a classification unit 15 that classifies the plurality of pieces of operation information into a plurality of groups, and an analysis unit 16 that analyzes operations of a person to be analyzed based on operation information that has been classified into one of the plurality of groups.

Figure 3:
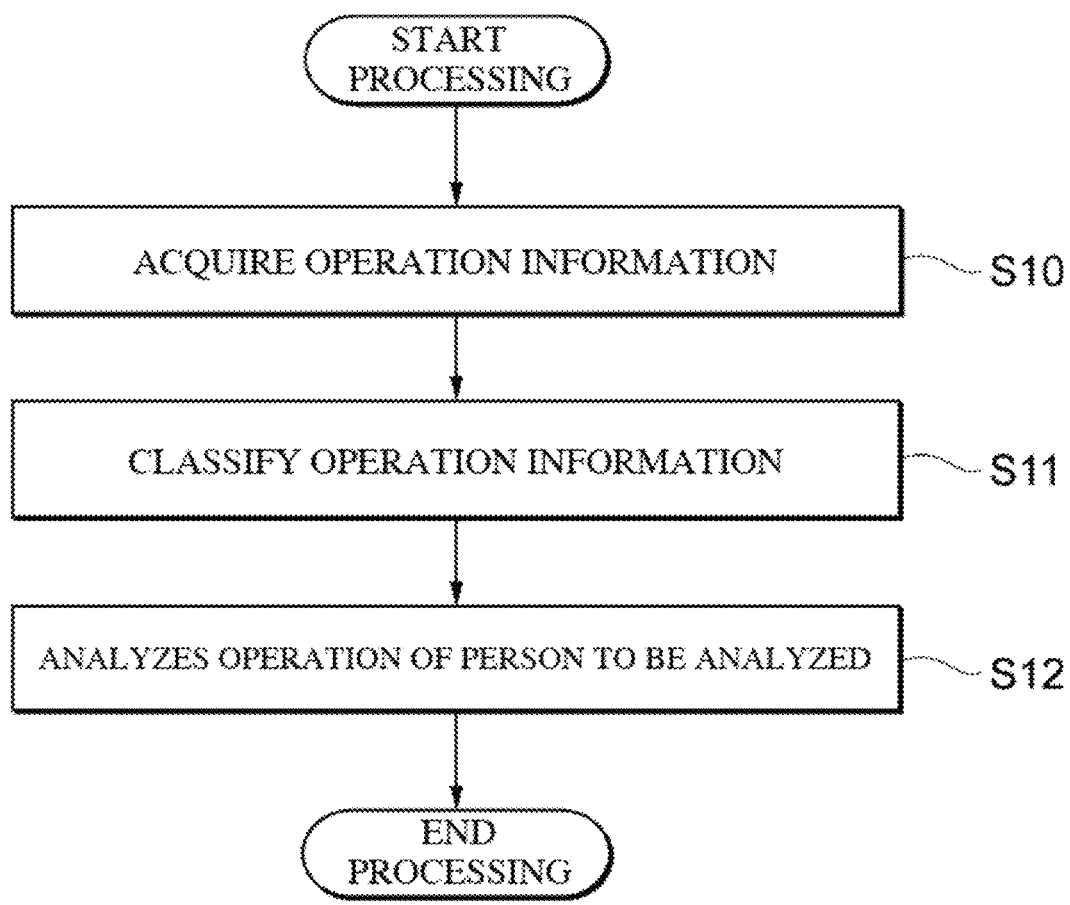
FIG. 3 is a flow diagram illustrating a first example of analysis processing executed by an operation analysis apparatus according to one or more embodiments.

FIG. 3 is a flowchart of a first example of analysis processing executed by the operation analysis apparatus 10 according to one or more embodiments. The acquisition unit 11 of the operation analysis apparatus 10 acquires operation information from the first, second, and third image capturing units 20a, 20b, and 20c, and the measurement unit 30 (S10). The acquisition unit 11 may acquire moving images from the first, second, and third image capturing units 20a, 20b, and 20c as the operation information. Also, the acquisition unit 11 may acquire coordinate values of a plurality of nodes corresponding to a plurality of body parts of a person to be analyzed from the measurement unit 30 as the operation information. The acquisition unit 11 may acquire a plurality of pieces of operation information at the same time, or may acquire the plurality of pieces of operation information at respective different timings.

The classification unit 15 of the operation analysis apparatus 10 classifies a plurality of pieces of operation information into a plurality of groups (S11). Here, the classification unit 15 may classify the plurality of pieces of operation information using skeleton information included in the operation information. That is, the plurality of groups are for classifying the persons to be analyzed using their physical features. For example, the classification unit 15 classifies the plurality of persons to be analyzed based on the skeletons of the respective persons to be analyzed using the plurality of pieces of operation information. Specifically, the classification unit 15 may classify the plurality of pieces of operation information into a plurality of groups that respectively represent approximate body builds of the persons to be analyzed based on positions of a plurality of body parts indicated by the skeleton information. For example, the classification unit 15 may classify the plurality of pieces of operation information into a group of large persons to be analyzed and a group of small persons to be analyzed.

The analysis unit 16 of the operation analysis apparatus 10 analyzes the operations of a person to be analyzed based on operation information that has been classified into one of the plurality of groups (S12). For example, the analysis unit 16 may analyze whether or not a non-standard operation has been performed or the proficiency in an operation by analyzing the operation time that it took until the person to be analyzed has completed the operation based on the operation information that has been classified into "large persons" and "small persons". The analysis unit 16 may also change the analysis method or the reference used for the analysis for each of the groups that have been classified by the classification unit 15. Note that the group to be analyzed by the analysis unit 16 may be a specific group or groups of the plurality of groups or all of the groups. The analysis unit 16 may also output the information indicating an analysis result to a display unit or another apparatus.

The operation analysis apparatus 10 according to one or more embodiments classifies operation information using skeleton information, and analyzes operations based on the classification result. With this, the operation analysis apparatus 10 can perform an analysis, on persons to be analyzed, according to physical features such as their skeletons. Therefore, the operation analysis apparatus 10 can analyze the operation performed by a person to be analyzed with high accuracy compared with a case where the operation of the person to be analyzed is similarly analyzed regardless of the physical features of the person. For example, the manner of an operation of a large person may differ from the manner of the operation of a small person, and there are cases where, if the operation of a person to be analyzed is analyzed using the same reference when pieces of operation information of a large person to be analyzed and a small-person to be analyzed are mixed, correct analysis cannot be performed, or the accuracy of the analysis decreases. In this regard, with the operation analysis apparatus 10 according to one or more embodiments, pieces of operation information of persons to be analyzed are grouped into a group of large persons and a group of small persons, and the operation of a person to be analyzed can be analyzed based on the operation information that has been classified into the group corresponding to the person to be analyzed. That is, the operations of a large person and the operations of a small person are separately analyzed, and the operation of a person to be analyzed can be analyzed with high accuracy.

Also, for example, operations that can be performed by a person to be analyzed having a specific body part that is defective may differ from the operations that can be performed by a healthy person, and there are cases where, if the operation of a person to be analyzed is analyzed using the same reference when pieces of operation information of the person to be analyzed having a specific body part that is defective and the healthy person are mixed, correct analysis cannot be performed, or the accuracy of the analysis decreases. In this regard, with the operation analysis apparatus 10 according to one or more embodiments, pieces of operation information of persons to be analyzed are classified into a group of persons having a specific body part that is defective and a group of healthy-persons to be analyzed, and the operation of a person to be analyzed can be analyzed based on the operation information that has been classified into the group corresponding to the person to be analyzed. That is, the operations of a person to be analyzed having a specific body part that is defective and the operations of a healthy person are separately analyzed, and the operation of a person to be analyzed can be analyzed with high accuracy.

2. Exemplary Configuration

Functional Configuration

Figure 4:
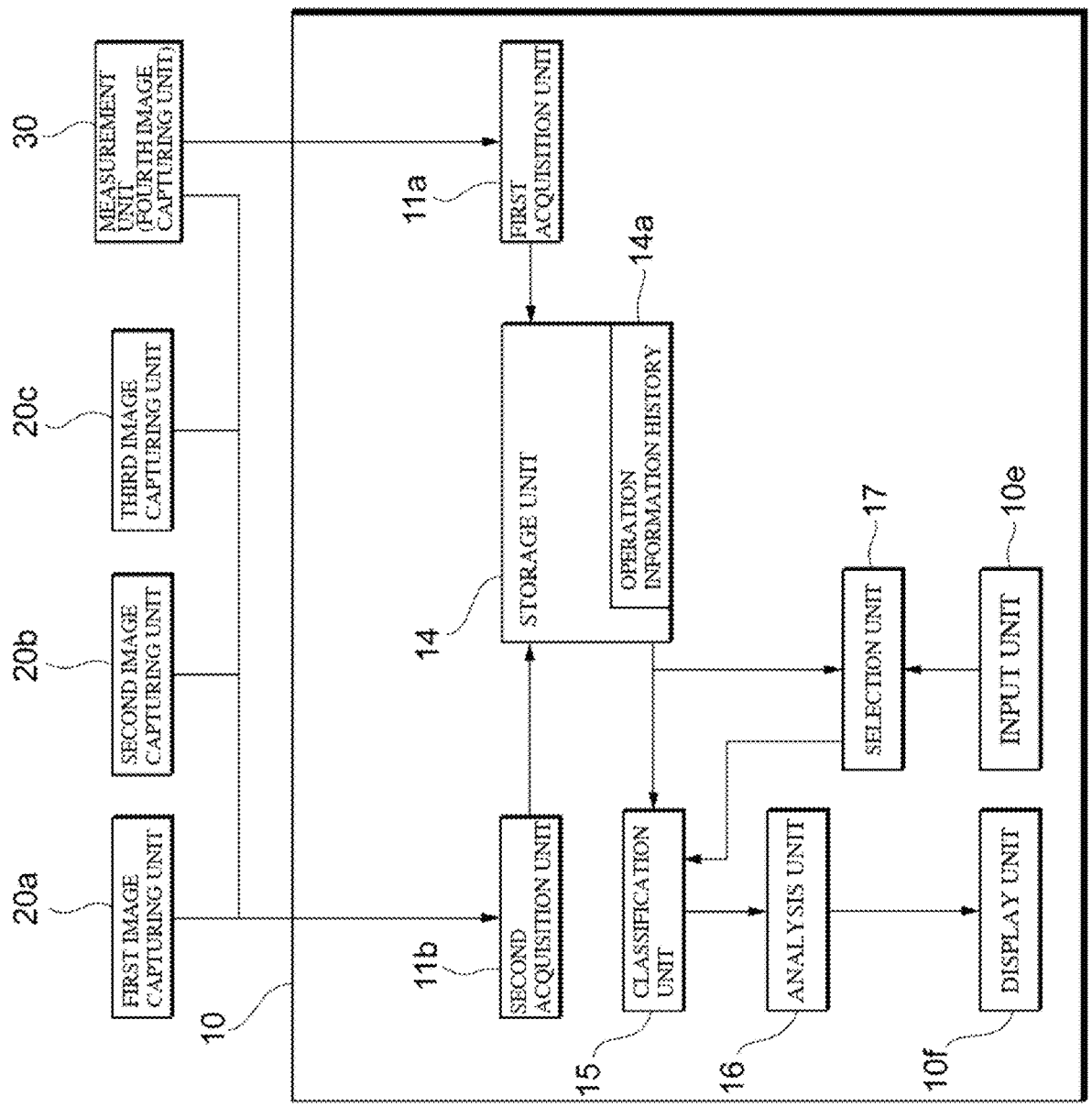
FIG. 4 is a functional block diagram illustrating an operation analysis apparatus according to one or more embodiments.

Next, an example of the functional configuration of the operation analysis system 100 according to one or more embodiments will be described using FIG. 4. The operation analysis system 100 includes the first, second, and third image capturing units 20a, 20b, and 20c, the measurement unit 30, and the operation analysis apparatus 10. Also, the operation analysis apparatus 10 includes first, second, and third acquisition units 11a, 11b, and 11c, a storage unit 14, a classification unit 15, an analysis unit 16, a selection unit 17, an input unit 10e, and a display unit 10f.

Image Capturing Unit

The first, second, and third image capturing units 20a, 20b, and 20c may each be constituted by a general purpose camera, and may capture moving images including scenes in which first and second operators A1 and A2 perform operations in the operation region R. The moving image is an example of the operation information, and includes skeleton information indicating the positions of a plurality of body parts that are associated with the skeleton of a person to be analyzed. The moving image may be used as the operation information as is, or may also be used to analyze the positions of the plurality of body parts that are associated with the skeleton of the person to be analyzed based on the moving image. The first, second, and third image capturing units 20a, 20b, and 20c may each capture a portion of the operation region R, and may each capture a moving image of a region smaller than the operation region R. Specifically, the first, second, and third image capturing units 20a, 20b, and 20c may capture moving images of operations performed by the first and second operators A1 and A2 focusing on specific regions. The first, second, and third image capturing units 20a, 20b, and 20c may also capture close-up moving images of hands of the first and second operators A1 and A2.

Also, the first, second, and third image capturing units 20a, 20b, and 20c may also capture a plurality of moving images that respectively capture a plurality of portions that constitute the operation region R. For example, the first image capturing unit 20a may mainly capture a moving image of the first operator A1 performing operations, the third image capturing unit 20c may mainly capture a moving image of the second operator A2 performing operations, and the second image capturing unit 20b may capture a moving image of the first operator A1 performing operations and a moving image of the second operator A2 performing operations. Also, the first, second, and third image capturing units 20a, 20b, and 20c may capture moving images that respectively capture processes executed at a plurality of positions in the operation region R.

Measurement Unit

The measurement unit 30 may be configured to perform motion capturing, and may measure operation information that includes skeleton information indicating the positions of a plurality of body parts that are associated with the skeletons of the first operator A1 and the second operator A2 that perform operations in a certain operation region R. The measurement unit 30 may measure operation information of a plurality of operators, and may include a single unit, or a plurality of units. Any configuration of the measurement unit 30 may be adopted, and a configuration may be adopted in which patterned light is projected on the first and second operators A1 and A2, moving images of the first and second operators A1 and A2 on which patterned light is projected are captured, and coordinate values of a plurality of body parts, of the first and second operators A1 and A2, that are associated with the skeletons of the first and second operators A1 and A2 are measured based on the captured moving images, for example. Also, when a plurality of pieces of operation information regarding a plurality of operators are measured, the measurement unit 30 may add information for identifying the operator to each operation information. The measurement unit 30 may measure coordinate values of any parts, such as joints, a head, shoulders, and a waist, of the first and second operators A1 and A2. Also, the measurement unit 30 may also measure coordinate values of positions of trackers that are attached to the first and second operators A1 and A2. Also, the measurement unit 30 may also measure operation information including skeleton information that indicates positions of a plurality of body parts that are associated with the skeletons of the operators based on the moving images by analyzing moving images of the first and second operators A1 and A2.

The operation analysis system 100 may also include a plurality of measurement units 30. When the operation information of a plurality of operators is measured using a plurality of measurement units 30, operation information of the same operator may be measured by two or more measurement units 30. In such a case, by adding information for identifying operators to the operation information, one of the pieces of operation information may be selected, or the pieces of operation information measured by different measurement units 30 may be combined. Note that, when the operation information of a plurality of operators are measured using a plurality of measurement units 30, each measurement unit 30 may also measure operation information of only one operator.

The measurement unit 30 may also function as a fourth image capturing unit that captures moving images of the first and second operators A1 and A2 performing operations. The fourth image capturing unit may capture a moving image of the entire operation region R. That is, the fourth image capturing unit may capture the first and second operators A1 and A2 performing operations so as to include both of the first and second operators A1 and A2. On the other hand, the first, second, and third image capturing units 20a, 20b, and 20c may capture moving images of the first and second operators A1 and A2 performing operations so as to capture one of the first and second operators A1 and A2.

Operation Analysis Apparatus

The first acquisition unit 11a may acquire operation information of the first and second operators A1 and A2 from the measurement unit 30. The operation information acquired by the first acquisition unit 11a is transmitted to and stored in the storage unit 14 as an operation information history 14a. If the operation analysis system 100 includes a plurality of measurement units 30, the first acquisition unit 11a may acquire operation information from each of the plurality of measurement units 30, and may transmit to the storage unit 14 each operation information by adding information for identifying the measurement unit 30 from which the operation information has been acquired. Note that the operation information may be information obtained by measuring coordinate values of positions of a plurality of body parts that are associated with the skeleton of an operator at intervals of one second, for example.

The second acquisition unit 12 may acquire moving images that have captured the first and second operators A1 and A2 performing operations from the first, second, and third image capturing units 20a, 20b, and 20c and the measurement unit 30 (fourth image capturing unit). The moving images acquired by the second acquisition unit 12 are transmitted to and stored in the storage unit 14 as an operation information history 14a. The second acquisition unit 12 may transmit a moving image to the storage unit 14 by adding information for identifying the image capturing unit, of the plurality of image capturing unit, from which the moving image has been acquired.

The storage unit 14 may store the operation information history 14a. The operation information history 14a may include a history of coordinate values of a plurality of body parts of a person to be analyzed measured by the measurement unit 30, and a history of moving images of the person to be analyzed captured by the first, second, and third image capturing units 20a, 20b, and 20c.

The classification unit 15 may classify a plurality of pieces of operation information into a plurality of groups. The classification unit 15 may classify the plurality of pieces of operation information using skeleton information included in the operation information. The classification unit 15 may classify the plurality of pieces of operation information into the plurality of groups based on the difference between skeleton information included in one operation information and the skeleton information included in another operation information of the plurality of pieces of operation information. Here, the difference in the skeleton information may be a difference in position of each of the plurality of body parts of a person to be analyzed indicated by the skeleton information. Also, when the plurality of persons to be analyzed include a person having a specific body part that is defective, the difference in skeleton information indicates whether or not the body parts of a person to be analyzed indicated by the skeleton information are defective.

A plurality of pieces of operation information is classified into a plurality of groups based on the difference in skeleton information, in this way, and as a result, the plurality of pieces of operation information can be classified into the plurality of groups based on the difference in body build of persons to be analyzed, and the pieces of operation information of persons to be analyzed who have the similar body build can be classified into one group. Accordingly, the operation of a person to be analyzed can be analyzed by performing a comparison with operations of persons who have similar body build.

The classification unit 15 may also classify a plurality of pieces of operation information into a plurality of groups based on the difference between the skeleton information included in each of the plurality of pieces of operation information and predetermined reference information. Here, the predetermined reference information is information that can be compared with the positions of a plurality of body parts, and may be information indicating the range of the operation region, for example. The classification unit 15 may also classify a plurality of pieces of operation information into a plurality of groups based on which of ranges of a plurality of operation regions the positions of the plurality of body parts of a person to be analyzed indicated by the skeleton information are included.

As a result of a plurality of pieces of operation information being classified into a plurality of groups based on the difference between the skeleton information and a predetermined reference information, in this way, the plurality of pieces of operation information can be classified into groups based on the reference information, and pieces of operation information of persons to be analyzed who have a similar property with respect to the reference information can be classified into one group. Accordingly, the operation of a person to be analyzed can be analyzed by performing comparison with operations of persons to be analyzed who have a similar property with respect to the reference information. For example, if the reference information is information indicating ranges of a plurality of operation regions, pieces of operation information of the persons to be analyzed are classified into a plurality of groups based on which of the ranges of the plurality of operation regions the operations have been performed, and the operations of persons to be analyzed can be analyzed for each operation region.

The analysis unit 16 analyzes the operation of a person to be analyzed based on the operation information that has been classified into one of the plurality of groups. The analysis unit 16 may analyze whether or not an anomaly is present in the operation of the person to be analyzed based on a feature amount that is calculated based on the operation information and represents a feature of the operation of the person to be analyzed. Here, the feature amount representing the feature of the operation of the person to be analyzed is a numerical value with which a feature of the operation of the person to be analyzed can be characterized, and may include at least one of the length of a locus (trajectory) of a specific part of the person to be analyzed and the operation time of the person to be analyzed. Here, the operation time may be a length of time from when the person to be analyzed has started the operation until the end of the operation.

As described above, pieces of operation information of persons to be analyzed are classified into groups considering the body builds of the persons to be analyzed, and the feature amounts representing the operations of persons to be analyzed that belong to the same group are compared, and as a result, whether or not the operation of the person to be analyzed has an anomaly relative to the operations of other persons to be analyzed who have a similar body build can be analyzed, and whether or not an anomaly is present in the operation of the person to be analyzed can be analyzed with high accuracy.

Also, as a result of the feature amount including at least one of the length of a locus (trajectory) of a specific part of a person to be analyzed and the operation time of the person to be analyzed, the operations of persons to be analyzed are classified into groups considering the body builds of the persons to be analyzed, and at least one of the length of a locus of a specific part of a person to be analyzed and the operation time of the person to be analyzed can be compared with those of persons to be analyzed belonging to the same group, and the operation of the person to be analyzed can be analyzed with high accuracy.

The analysis unit 16 may analyze the proficiency in an operation of a person to be analyzed based on a feature amount that is calculated based on operation information and represents a feature of the operation of the person to be analyzed. The proficiency in an operation of a person to be analyzed may be an index for evaluating the speed and correctness of a predetermined operation performed by the person to be analyzed, and may be expressed by a rate at which the operation time decreases with respect to the number of executions of a predetermined operation, for example. Also, the proficiency may also simply be an operation time.

As described above, the operations of persons to be analyzed are classified into groups considering the body builds of the persons to be analyzed, and the feature amounts representing the features of the operations of the persons to be analyzed who belong to the same group are extracted, and as a result, the proficiency in the operation of persons to be analyzed who have a similar body build can be analyzed, and the proficiency in the operation of the person to be analyzed can be analyzed at high accuracy.

The selection unit 17 selects a plurality of parts to be used when the classification unit 15 performs classification, from a plurality of body parts that are associated with the skeleton of a person to be analyzed. The selection unit 17 may selects a plurality of parts to be used when the classification unit 15 performs classification based on a history of skeleton information included in the operation information history 14*a*. Also, the selection unit 17 may selects the plurality of parts to be used when the classification unit 15 performs classification based on an input made in the input unit 10*e*.

A plurality of parts that well represents the physical feature of a person to be analyzed can be selected by the selection unit 17, and pieces of operation information are classified into groups in order to accurately recognize the physical feature of the person to be analyzed, and as a result, the operation of the person to be analyzed can be analyzed with high accuracy.

The selection unit 17 may also select each of a plurality of parts to be used when the classification unit 15 performs classification based on whether or not the data of the part is acquired from all of a plurality of persons to be analyzed. For example, when the skeleton information indicates positions of a plurality of joints, if the positions of specific joints are acquired from all of a plurality of persons to be analyzed, and the position of each of the other joints are acquired only for some of the plurality of persons to be analyzed, the selection unit 17 may select the specific joints whose positions are acquired from all of the plurality of persons to be analyzed as the parts to be used when the classification unit 15 performs classification.

As described above, as a result of selecting parts whose positions are acquired from all of a plurality of persons to be analyzed as the parts to be used when the classification unit 15 performs classification, the physical features of the plurality of persons to be analyzed can be classified based on the parts in common, pieces of operation information can be classified into groups such that the physical feature of a person to be analyzed can be accurately recognized, and the operation of the person to be analyzed can be analyzed with high accuracy.

The selection unit 17 may also select a part used when the classification unit 15 performs classification based on a comparison between the distance between two adjacent parts of the plurality of parts and the distance between two other adjacent parts of the plurality of parts. For example, an elbow and a wrist are two adjacent parts, and the elbow and a shoulder are two other adjacent parts. The selection unit 17 may select two parts whose distance is larger when the distance between an elbow and a wrist is compared with the distance between the elbow and a shoulder, as the parts to be used when the classification unit 15 performs classification, for example. As a result of selecting two adjacent parts whose distance is long, parts whose positions can be measured with small relative error can be selected.

As described above, by comparing the distance between two adjacent parts of the plurality of parts with the distance between two other adjacent parts of the plurality of parts, the parts to be used when the classification unit 15 performs classification can be selected such that the relative error when the positions are measured decreases, and the operation of a person to be analyzed can be analyzed with high accuracy by classifying pieces of operation information into groups such that the physical feature of a person to be analyzed can be accurately recognized.

Hardware Configuration

Figure 5:
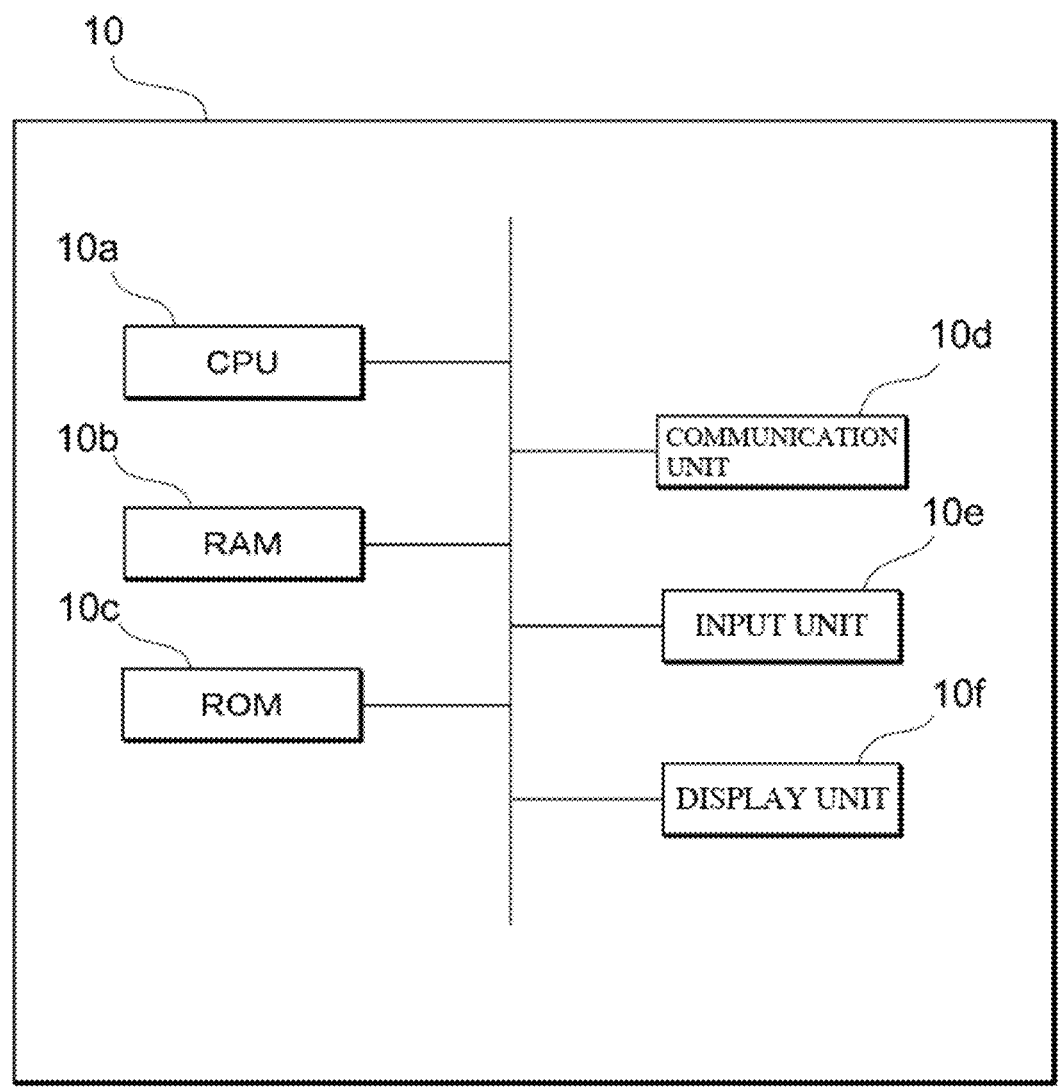
FIG. 5 is a diagram illustrating a physical configuration of an operation analysis apparatus according to one or more embodiments.

Next, an example of the hardware configuration of the operation analysis apparatus 10 according to one or more embodiments will be described using FIG. 5. The operation analysis apparatus 10 includes a CPU (central processing unit) 10a corresponding to a computation apparatus, a RAM (random access memory) 10b corresponding to the storage unit 14, a ROM (read only memory) 10c corresponding to the storage unit 14, a communication unit 10d, an input unit 10e, and the display unit 10f. These constituent elements are connected to each other via a bus so as to be able to transmit and receive data. Note that this example will describe a case where the operation analysis apparatus 10 is constituted by one computer, but the operation analysis apparatus 10 may also be realized by a plurality of computers.

The CPU 10a is a control unit that performs control regarding execution of programs stored in the RAM 10b or the ROM 10c, and performs computation and processing of data. The CPU 10a is a computation apparatus that executes a program (operation analysis program) for classifying a plurality of pieces of operation information into a plurality of groups using skeleton information included in each of them, and analyzing the operation of a person to be analyzed based on the operation information that has been classified into one of the plurality of groups. The CPU 10a receives various types of input data from the input unit 10e and the communication unit 10d, and displays results of computation performed on input data in the display unit 10f, or stores the results in the RAM 10b or ROM 10c.

The RAM 10b is a component of the storage unit 14 whose data is re-writable, and may be a semiconductor memory device, for example. The RAM 10b stores an operation analysis program to be executed by the CPU 10a and data such as the operation information history 14a.

The ROM 10c is a component of the storage unit 14 from which data can be read out, and may be a semiconductor memory device, for example. The ROM 10c stores the operation analysis program and data that is not to be re-written, for example.

The communication unit 10d is an interface for connecting the operation analysis apparatus 10 to an external device. The communication unit 10d is connected to the first, second, and third image capturing units 20a, 20b, and 20c and the measurement unit 30 by a LAN (local area network), for example, and may receive moving images from the first, second, and third image capturing units 20a, 20b, and 20c, and receive moving images and operation information from the measurement unit 30. Also, the communication unit 10d may be connected to the Internet, and receive moving images and operation information via the Internet. Also, the communication unit 10d may transmit analysis results of the analysis unit 16 to an external device.

The input unit 10e receives inputs of data from a user, and may include a keyboard, a mouse, and a touch panel, for example.

The display unit 10f visually displays results of computation performed by the CPU 10a, and may be an LCD (liquid crystal display), for example. The display unit 10f may display analysis results of the analysis unit 16.

The operation analysis program may be provided by being stored in a computer-readable storage medium such as the RAM 10b or ROM 10c, or may be provided via a communication network connected by the communication unit 10d. The operation analysis apparatus 10 realizes various operations including operations realized by the first, second, and third acquisition units 11a, 11b, and 11c, the classification unit 15, the analysis unit 16, and the selection unit 17, which have been described using FIG. 4, as a result of the CPU 10a executing the operation analysis program. These physical configurations are merely examples and need not be independent configurations. For example, the operation analysis apparatus 10 may include an LSI (large-scale integration) chip that integrates the CPU 10a, the RAM 10b, and the ROM 10c.

3. Exemplary Operation

Figure 6:
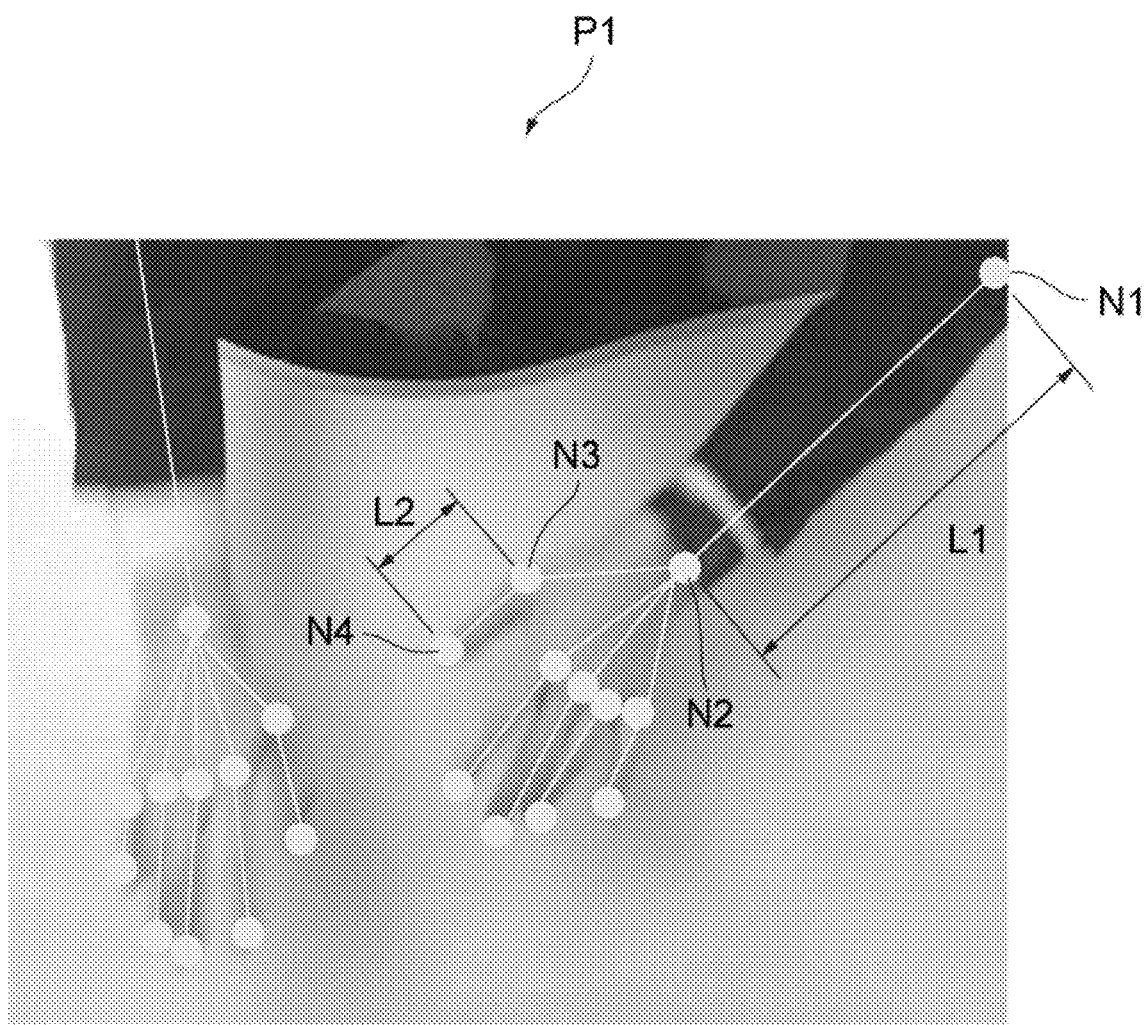
FIG. 6 is a diagram illustrating an example of operation information that is measured by an operation analysis apparatus according to one or more embodiments.

FIG. 6 is a diagram illustrating an example of operation information measured by the operation analysis system 100 according to one or more embodiments. FIG. 6 shown an image P1 captured by the measurement unit 30 and skeleton information measured by the measurement unit 30. The skeleton information may include coordinate values of a plurality of nodes corresponding to a plurality of body parts of a person to be analyzed. The plurality of nodes may be nodes in a skeleton model corresponding to the plurality of body parts that have been associated with the skeleton of the person to be analyzed, and the distances between a plurality of nodes may be lengths of edges in the skeleton model. Here, the skeleton model may be a model indicating the outline of the body build of the person to be analyzed using a plurality of edges and a plurality of nodes. The outline of the skeleton of the person to be analyzed may be indicated by the plurality of edges, and the end points and the connection points of the plurality of edges may be indicated by the plurality of nodes. In this example, the plurality of nodes corresponding to the plurality of body parts of the person to be analyzed are indicated by white filled circles, and the edges between nodes are indicated by white lines.

The skeleton information of this example includes a coordinate value of a first node N1 corresponding to an elbow, a coordinate value of a second node N2 corresponding to a wrist, a coordinate value of a third node N3 corresponding to a second joint of a thumb, and a coordinate value of a fourth node N4 corresponding to a tip of the thumb. Note that the skeleton information may further include other nodes (such as nodes of a right arm).

The classification unit 15 may classify a plurality of pieces of operation information into a plurality of groups by performing classification based on distances between a plurality of nodes that can be calculated based on the coordinate values of the plurality of nodes. For example, the classification unit 15 may calculate a distance between the first node N1 and the third node N3 for each of the plurality of persons to be analyzed, and classify the plurality of pieces of operation information into a group of persons whose distance between the first node N1 and the third node N3 is relatively large, and a group of persons whose distance between the first node N1 and the third node N3 is relatively small. The classification unit 15 may classify a plurality of pieces of operation information into a plurality of groups by performing classification based on the distance between two nodes that are not adjacent to each other such as the first node N1 and the third node N3.

As a result of classifying a plurality of pieces of operation information into a plurality of groups based on the distances between a plurality of nodes, in this way, the pieces of operation information can be classified into groups based on the difference in body build of persons to be analyzed, and persons to be analyzed whose body builds are similar can be classified into one group. With this, an operation of a person to be analyzed can be analyzed by comparing the operation with the operations of persons to be analyzed whose body builds are similar to that of the person to be analyzed.

The classification unit 15 may classify a plurality of pieces of operation information into a plurality of groups, by performing classification based on a distance between two adjacent nodes of a plurality of nodes. In this example, the first and second nodes N1 and N2 are two adjacent nodes, and the distance between the first node N1 and the second node N2 is L1. Also, the third and fourth nodes N3 and N4 are two adjacent nodes, and the distance between the third node N3 and the fourth node N4 is L2. The classification unit 15 may calculate the distance between the first node N1 and the second node N2, and may classify the plurality of pieces of operation information into a group of persons whose distance between the first node N1 and the second node N2 is relatively large, and a group of persons whose distance between the first node N1 and the second node N2 is relatively small. Similarly, the classification unit 15 may calculate the distance between the third node N3 and the fourth node N4, and may classify the plurality of pieces of operation information into a group of persons whose distance between the third node N3 and the fourth node N4 is relatively large, and a group of persons whose distance between the third node N3 and the fourth node N4 is relatively small.

As described above, as a result of classifying a plurality of pieces of operation information into a plurality of groups based on the distance between two adjacent nodes of a plurality of nodes, the pieces of operation information can be classified into groups based on the length that is unique to each person to be analyzed, and the operation of a person to be analyzed can be analyzed while accurately recognizing the physical feature of the person to be analyzed.

Also, the classification unit 15 may also classify pieces of operation information into a plurality of groups by performing classification based on the ratio between the distance between two adjacent nodes of a plurality of nodes and the distance between two other adjacent nodes of the plurality of nodes. The classification unit 15 may calculate a ratio L1/L2 (or L2/L1) between the distance L1 between the first node N1 and the second node N2 and the distance L2 between the third node N3 and the fourth node N4, and classify a plurality of pieces of operation information into a group of persons whose ratio L1/L2 is relatively large and a group of persons whose ratio L1/L2 is relatively small.

As a result of classifying a plurality of pieces of operation information into a plurality of groups based on the ratio between the distance between two adjacent nodes of a plurality of nodes and the distance between two other adjacent nodes, the pieces of operation information can be classified into groups based on an amount that is unique to each person to be analyzed and is independent of the measurement units, and the operation of a person to be analyzed can be analyzed while accurately recognizing the physical feature of the person to be analyzed.

The classification unit 15 may also classify a plurality of pieces of operation information into a plurality of groups by performing classification based on the ratio between the distance between a plurality of nodes and a reference distance that is acquired by the first acquisition unit 11a along with the plurality of pieces of operation information. Here, the reference distance is a distance that can be compared with the distance between two adjacent nodes, and may be the length of a specific tool used by an operator, or the length of a specific marker provided in an operation region, for example. The classification unit 15 may calculate the ratio L1/L3 (or L3/L1) between the distance L1 between the first node N1 and the second node N2 and a reference distance L3, and classify the plurality of pieces of operation information into a group of persons whose ratio L1/L3 is relatively large and a group of persons whose ratio L1/L3 is relatively small.

As a result of classifying a plurality of pieces of operation information into a plurality of groups based on the ratio between the distance between two adjacent nodes of a plurality of nodes and a reference distance, the pieces of operation information can be classified into groups based on an amount that is unique to each person to be analyzed and is independent of the measurement units, and the operation of a person to be analyzed can be analyzed while accurately recognizing the physical feature of the person to be analyzed.

The coordinate values of a plurality of nodes included in the skeleton information may be three-dimensional coordinate values. In this case, the classification unit 15 may classify a plurality of pieces of operation information into a plurality of groups by performing classification based on the distance between a plurality of nodes that can be calculated based on three-dimensional coordinate values. For example, when the three-dimensional coordinate value of the first node N1 is (x1, y1, z1), and the three-dimensional coordinate value of the second node N2 is (x2, y2, z2), the classification unit 15 may calculate the distance between the first node N1 and the second node N2 using the expression $((x1-x2)^2+(y1-y2)^2+(z1-z2)^2)^{1/2}$. Also, the classification unit 15 may classify a plurality of pieces of operation information into a group of persons whose distance between the first node N1 and the second node N2 is relatively large, and a group of persons whose distance between the first node N1 and the second node N2 is relatively small. The first or second acquisition unit 11a or 11b may acquire the three-dimensional coordinate values of the plurality of nodes by performing motion capturing or by performing measurement using a stereo camera.

As a result of classifying a plurality of pieces of operation information into a plurality of groups based on the distance between a plurality of nodes that can be calculated based on three-dimensional coordinate values, the pieces of operation information can be accurately classified into groups based on the difference in body build of persons to be analyzed, and an operation of a person to be analyzed can be analyzed by comparing the operation with the operations of persons to be analyzed whose body builds are similar to that of the person to be analyzed.

The coordinate values of a plurality of nodes included in the skeleton information may be associated with time instants (pointes in time) at which the respective coordinate values were measured. In this case, the classification unit 15 may classify a plurality of pieces of operation information into a plurality of groups based on an average distance between a plurality of nodes that are calculated based on a plurality of coordinate values measured at different time instants. For example, the classification unit 15 may calculate the distance between the first node N1 and the second node N2 at a plurality of different time instants from coordinate values of the first and second nodes N1 and N2 measured at the plurality of different time instants with respect to a person to be analyzed, and calculate the average distance. Also, the classification unit 15 may classify the plurality of pieces of operation information into a group of persons whose average distance between the first node N1 and the second node N2 is relatively large, and a group of persons whose average distance between the first node N1 and the second node N2 is relatively small.

As a result of classifying a plurality of pieces of operation information into a plurality of groups based on an average distance between a plurality of nodes obtained by performing measurement at different time instants, the pieces of operation information can be classified into groups while reducing influence of errors in the measurement of coordinate values of nodes, and an operation of a person to be analyzed can be accurately analyzed by comparing the operation with the operations of persons to be analyzed whose body builds are similar to that of the person to be analyzed.

Figure 7:
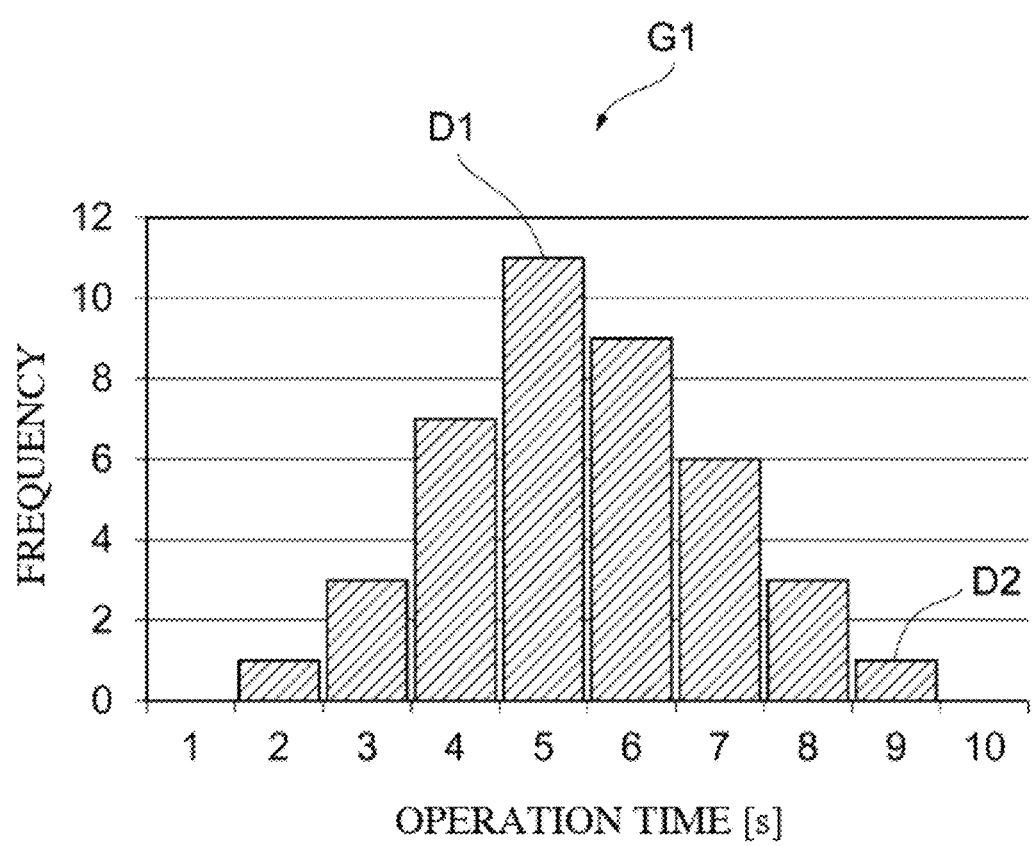
FIG. 7 is a diagram illustrating an example of a histogram of task times of a plurality of operators.

FIG. 7 is a diagram illustrating an example of a histogram G1 of task times of a plurality of operators. In the histogram G1, the horizontal axis shows the task time in units of seconds, and the vertical axis shows the frequency. The histogram G1 shows the frequency of occurrence of task times when the plurality of operators perform the same task. In the histogram G1, the frequency of first data D1 indicating that the task time is five seconds is eleven, and is largest. Also, the histogram G1 includes second data D2, indicating that the task time is nine seconds, whose frequency is one.

The histogram G1 can be approximated by a normal distribution whose average is the first data D1. Here, the task time of the second data D2, although being longer than the average to some extent, cannot be said as a singular value that can be determined as being out of standard.

Figure 8:
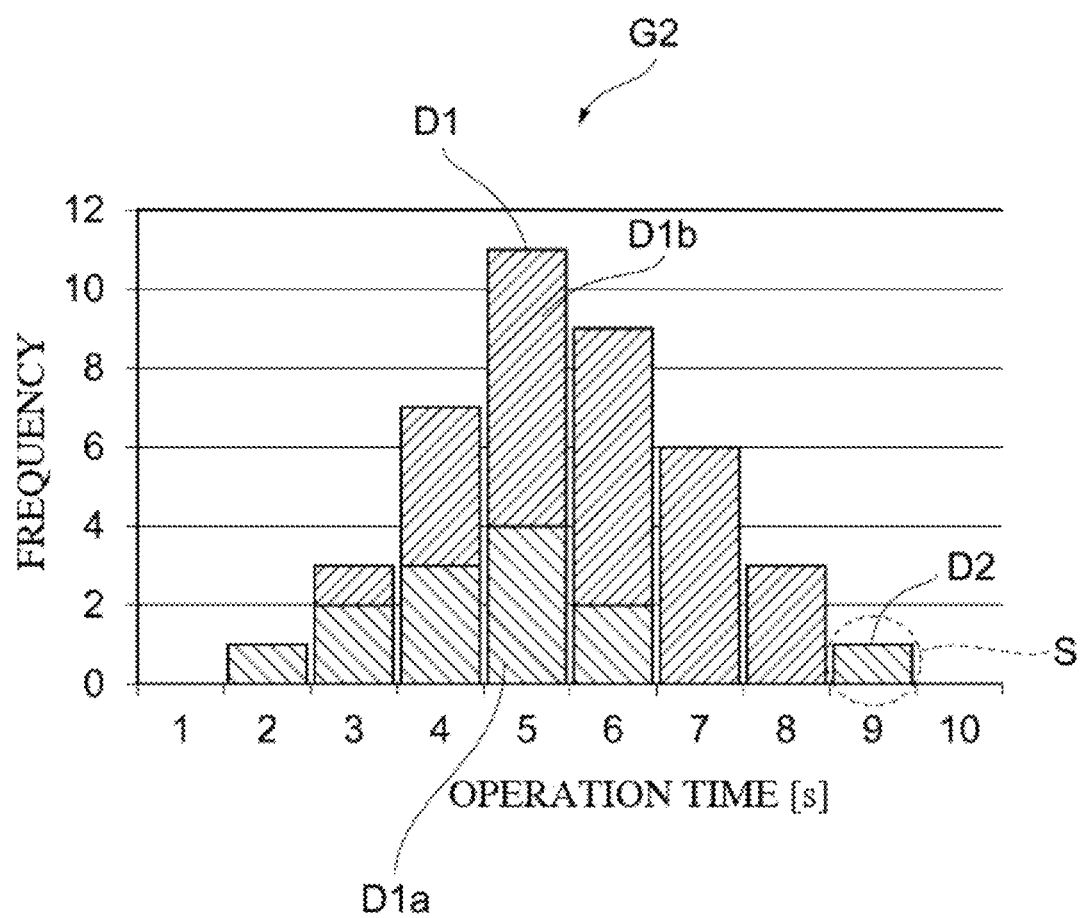
FIG. 8 is a diagram illustrating an example of a histogram of task times of a plurality of operators that have been analyzed by an operation analysis apparatus according to one or more embodiments.

FIG. 8 is a diagram illustrating an example of a histogram G2 of task times of a plurality of operators that are analyzed by the operation analysis apparatus 10 according to one or more embodiments. The histogram G2 shows a result obtained by the classification unit 15 classifying pieces of operation information into two groups based on the same data as those in the histogram G1 shown in FIG. 7, and the analysis unit 16 analyzing the frequency of occurrence of the operation times with respect to the two groups separately. In the histogram G2, the horizontal axis shows the task time in units of seconds, and the vertical axis shows the frequency. The analysis unit 16 calculates the operation time based on each operation information, calculates the frequency of occurrence of each of the operation times that are divided in the interval of one second for each of the two groups, and outputs the histogram G2. Here, the operation time is an example of the feature amount representing the feature of the operation of a person to be analyzed. The histogram G2 shows the frequency of occurrence of task times when the plurality of operators perform the same task, and the frequencies that are plotted based on pieces of operation information classified into the first group by the classification unit 15 are denoted by diagonally downward hatching, and the frequencies that are plotted based on pieces of operation information classified into the second group by the classification unit 15 are denoted by diagonally upward hatching.

In the histogram G2, the first data D1 whose task time is five seconds and whose frequency is eleven in total is divided into first data D1*a* of the first group and first data D1*b* of the second group. The frequency of the first data D1*a* of the first group whose task time is five seconds is four times, and the frequency of the first data D1*b* of the second group whose task time is five seconds is seven times.

In the histogram G2, data of the first group that is denoted by diagonally downward hatching is distributed around the first data D1*a* of the first group, the frequency of the first group is zero at the task time of seven and eight seconds, and the data of the first group includes the second data D2 as an outlier. In this case, the analysis unit 16 determines that the second data D2 of the first group is out of standard, and concludes that there was an anomaly in the operation of the operator of this case. The analysis unit 16 may display the second data D2 that has been determined as an anomaly in an emphasized manner by surrounding the data by a broken circle S. Note that any mode can be adopted to perform display in an emphasized manner, and the second data may be displayed in a color that can be easily noticed, or a text indicating the fact that an anomaly is present may be added.

As described above, with the operation analysis apparatus 10 according to one or more embodiments, pieces of operation information of persons to be analyzed are classified into a plurality of groups, and operations are analyzed based on pieces of operation information that have been classified into respective groups, and as a result, an operation tendency that was not clear when the plurality of pieces of operation information were collectively analyzed can be found out, and the operation of a person to be analyzed can be analyzed with high accuracy.

Figure 9:
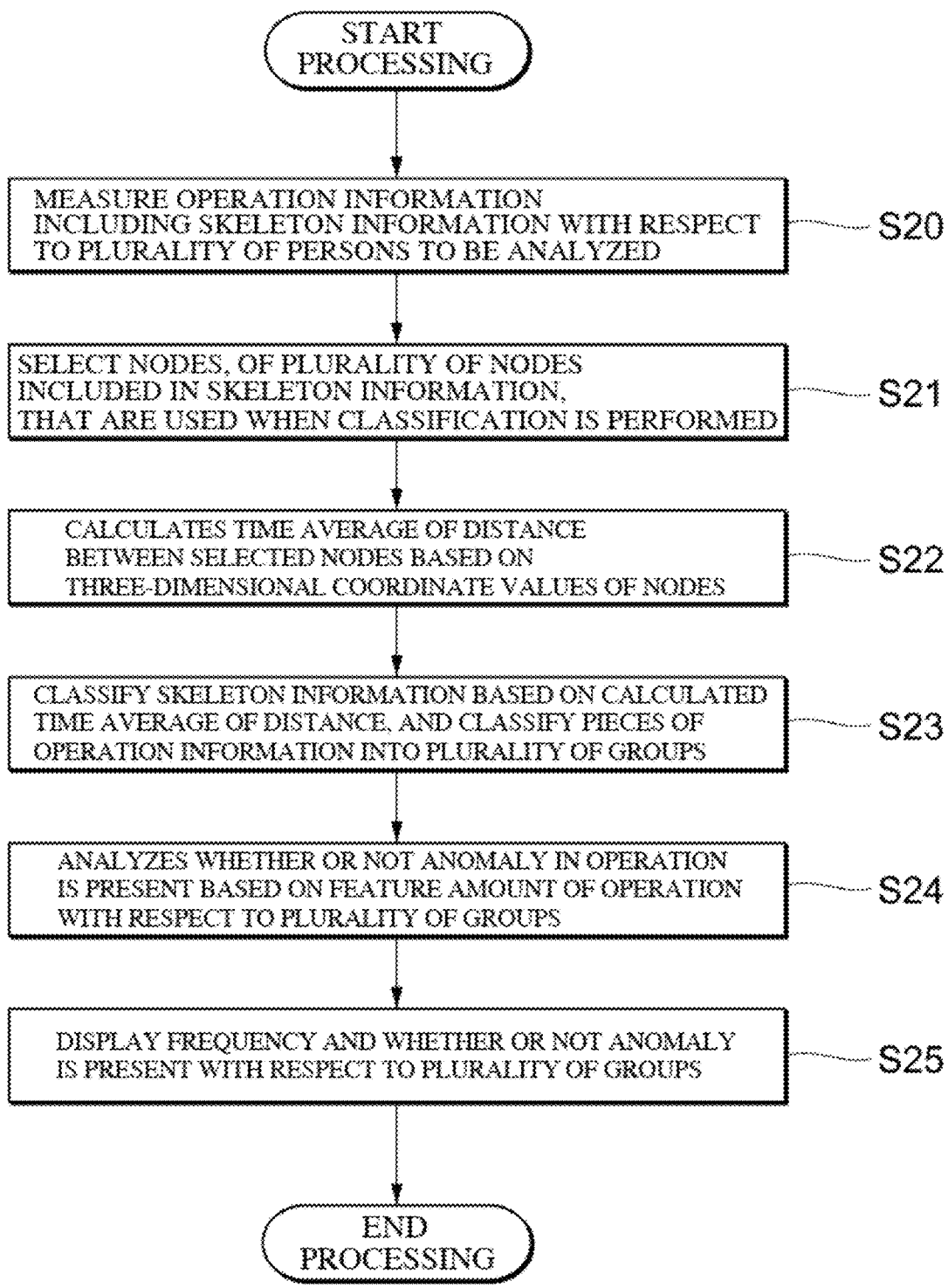
FIG. 9 is a flow diagram illustrating a second example of analysis processing executed by an operation analysis system according to one or more embodiments.

FIG. 9 is a flowchart of a second example of analysis processing executed by the operation analysis system 100 according to one or more embodiments. First, the first, second, and third image capturing units 20*a*, 20*b*, and 20*c* and the measurement unit 30 measure a plurality of pieces of operation information including skeleton information with respect to a plurality of persons to be analyzed (S20).

The selection unit 17 of the operation analysis apparatus 10 selects nodes, of a plurality of nodes included in the skeleton information, that are to be used when classification is performed (S21). Thereafter, the classification unit 15 calculates a time average of the distance between the selected nodes, based on three-dimensional coordinate values of the nodes (S22). Note that the time average of the distance between selected nodes may be an average distance between the selected nodes that is calculated based on three-dimensional coordinate values of the nodes measured at different time instants.

The classification unit 15 of the operation analysis apparatus 10 classifies pieces of skeleton information based on the calculated time averages of the distances, and classifies the pieces of operation information into a plurality of groups (S23). Also, the analysis unit 16 of the operation analysis apparatus 10 analyzes whether or not an anomaly in operation is present based on feature amounts of the operations with respect to each of the plurality of groups (S24). Finally, the operation analysis apparatus 10 displays the frequencies and whether or not an anomaly is present with respect to the plurality of groups in the display unit 10*f* (S25). Note that the frequencies and whether or not an anomaly is present with respect to the plurality of groups may be transmitted to an external device. Also, the analysis result of the analysis unit 16 may include information other than the frequencies and whether or not an anomaly is present with respect to the plurality of groups.

Figure 10:
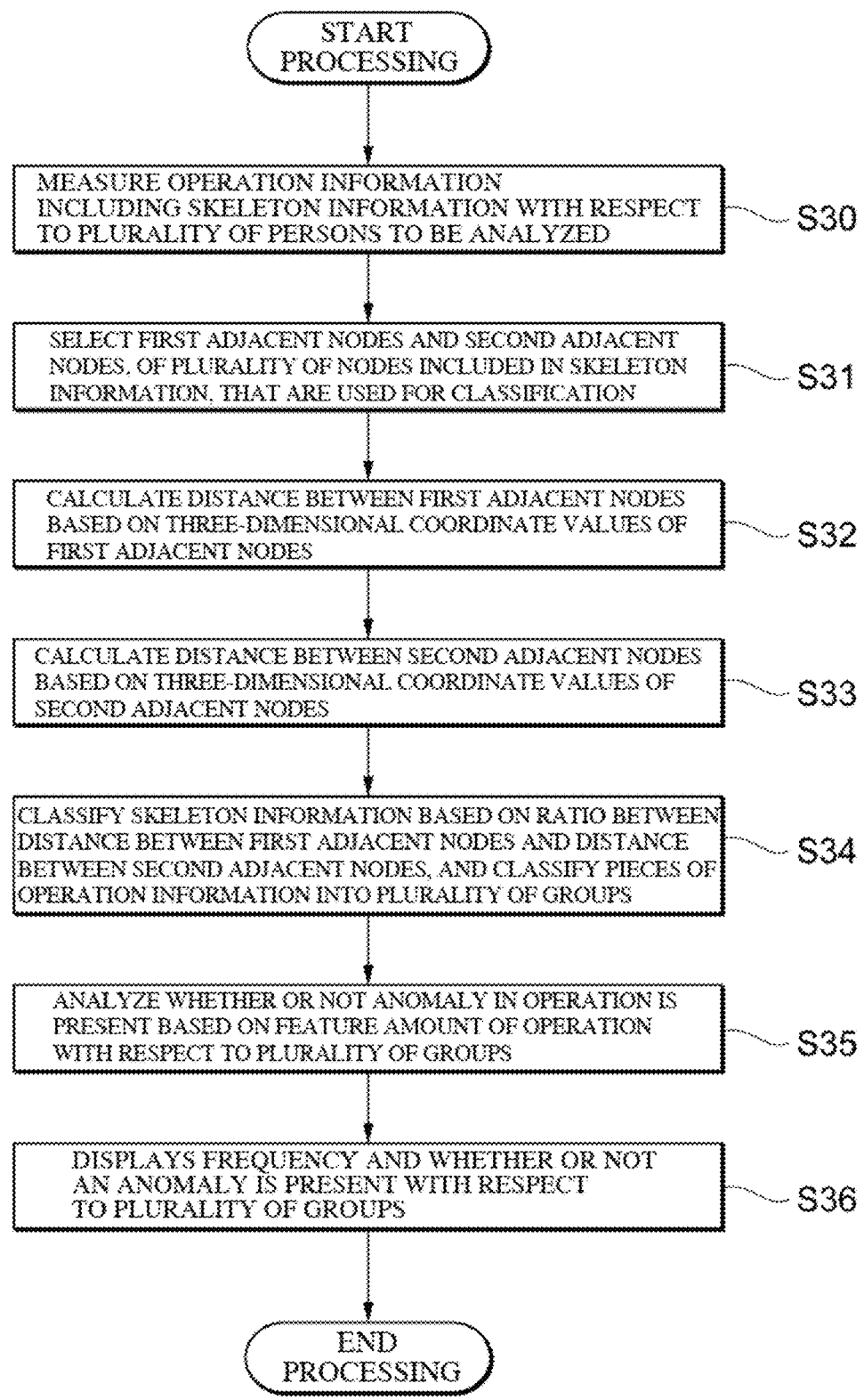
FIG. 10 is a flow diagram illustrating a third example of analysis processing executed by an operation analysis system according to one or more embodiments.

FIG. 10 is a flowchart of a third example of analysis processing executed by the operation analysis system 100 according to one or more embodiments. First, the first, second, and third image capturing units 20*a*, 20*b*, and 20*c* and the measurement unit 30 measure a plurality of pieces of operation information including skeleton information with respect to a plurality of persons to be analyzed (S30).

The selection unit 17 of the operation analysis apparatus 10 selects first adjacent nodes and second adjacent nodes, of a plurality of nodes included in the skeleton information, that are used for classification (S31). Here, the first adjacent nodes are two adjacent nodes of the plurality of nodes included in the skeleton information, and the second adjacent nodes are two other adjacent nodes of the plurality of nodes included in the skeleton information.

Thereafter, the classification unit 15 calculates the distance between the first adjacent nodes based on the three-dimensional coordinate values of the first adjacent nodes (S32), and calculates the distance between the second adjacent nodes based on the three-dimensional coordinate values of the second adjacent nodes (S33).

The classification unit 15 of the operation analysis apparatus 10 classifies the pieces of skeleton information based on the ratio between the distance between the first adjacent nodes and the distance between the second adjacent nodes that have been calculated, and classifies the pieces of operation information into a plurality of groups (S34). Note that the classification unit 15 may also classify the pieces of skeleton information based on the ratio between the distance between the first adjacent nodes or the distance between the second adjacent nodes and a reference distance that is acquired along with the plurality of pieces of operation information, and classify the pieces of operation information into a plurality of groups.

Then, the analysis unit 16 of the operation analysis apparatus 10 analyzes whether or not an anomaly in operation is present based on feature amounts of the operations with respect to each of the plurality of groups (S35). Finally, the operation analysis apparatus 10 displays the frequencies and whether or not an anomaly is present with respect to the plurality of groups in the display unit 10*f* (S36). Note that the frequencies and whether or not an anomaly is present with respect to the plurality of groups may be transmitted to an external device. Also, the analysis result of the analysis unit 16 may include information other than the frequencies and whether or not an anomaly is present with respect to the plurality of groups.

Figure 11:
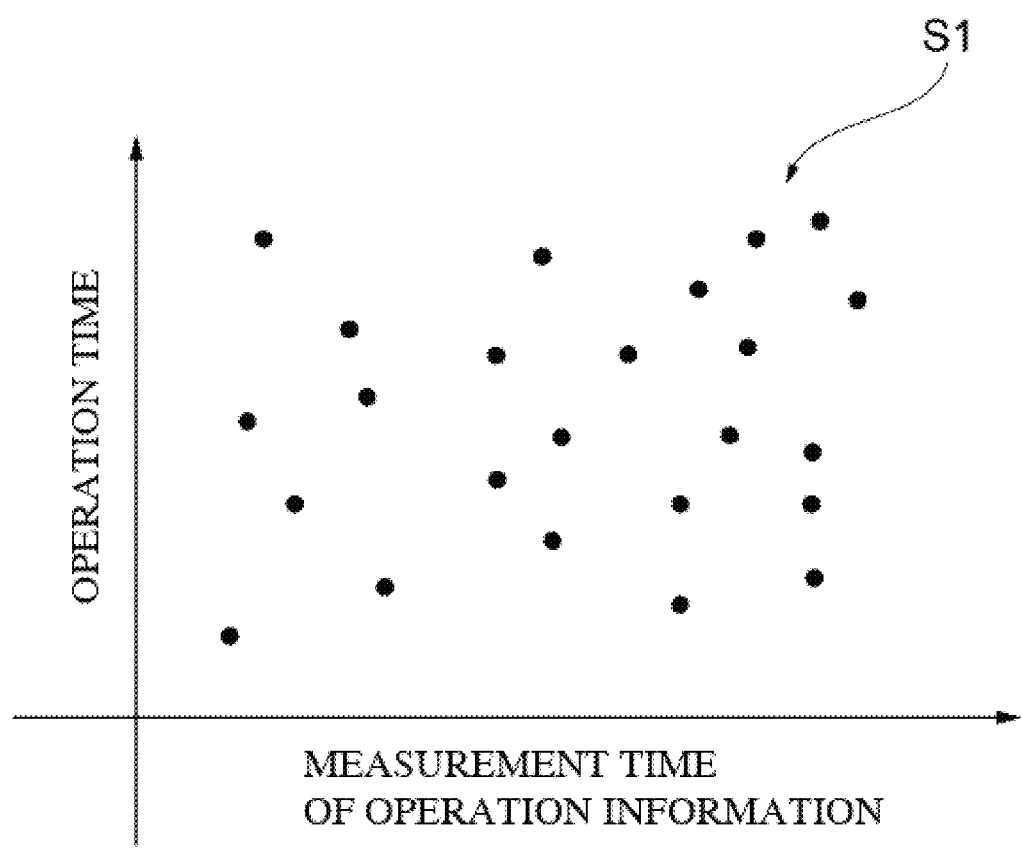
FIG. 11 is a diagram illustrating an example of a relationship between time instants at which pieces of operation information regarding a plurality of operators are measured and operation times.

FIG. 11 is a diagram illustrating an example of a relationship between time instants at which pieces of operation information regarding a plurality of operators are measured and operation times. FIG. 11 shows a distribution S1 of operation times in which the vertical axis shows the operation times when the plurality of operators have performed the same or the same type of task, and the horizontal axis shows the time instants at which the pieces of operation information have been measured. In the distribution S1 of operation times, the data points are scattered over various operation times and various measurement time instants, and a specific tendency cannot be found out.

Figure 12:
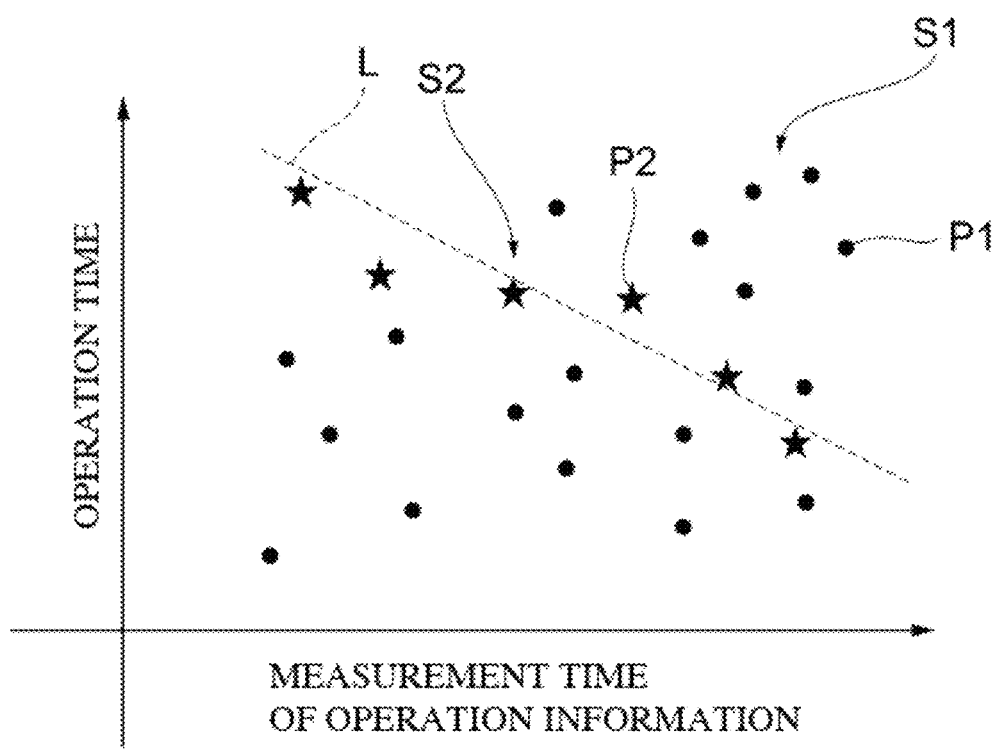
FIG. 12 is a diagram illustrating an example of a relationship between time instants at which pieces of operation information regarding the same or the same type of task of a plurality of operators are measured and operation times, the relationship been analyzed by an operation analysis apparatus according to one or more embodiments.

FIG. 12 is a diagram illustrating a relationship between operation times and time instants at which pieces of operation information are measured when a plurality of operators have performed the same or the same type of task, the relationship being analyzed by the operation analysis apparatus 10 according to one or more embodiments. FIG. 12 shows a distribution S1 and a distribution S2 of operation times in which the vertical axis shows the operation times when the plurality of operators have performed the same or the same type of task, and the horizontal axis shows the time instants at which the pieces of operation information have been measured. The distribution S1 of operation times shows a distribution of the operation times classified into a first group by the classification unit 15, and the distribution S2 of operation times shows a distribution of the operation times classified into a second group by the classification unit 15. In FIG. 12, the pieces of operation information belonging to the first group are plotted by filled circles P1, and the pieces of operation information belonging to the second group are plotted by filled stars P2. Note that the second group may be a group including only pieces of operation information of a specific operator. The analysis unit 16 calculates operation times based on the respective pieces of operation information, and outputs the distributions S1 and S2 of the operation time by plotting points relating to the specific operator (second group) by filled stars P2 for illustrating the relationship between the operation times and the measurement time instants, and plotting points relating to the other operators (first group) by filled circles P1 for illustrating the relationship between the operation times and the measurement time instants. Here, the operation time is an example of the feature amount representing the feature of an operation of a person to be analyzed.

The analysis unit 16 may analyze the relationship between the operation times and the measurement time instants of the specific operator shown by the filled stars P2, and output a graph L indicating the analysis result. In the example, the analysis unit 16 analyzes the relationship between the operation times and the measurement time instants of the specific operator shown by the filled stars P2 using a linear regression model, and outputs the linear graph L. Of course, the analysis unit 16 may analyze any feature amount representing the feature of an operation of a person to be analyzed using any mode.

The analysis unit 16 may analyze the proficiency in operation of a person to be analyzed based on a tendency of change in operation time in a process of the operator repeating the same operation. Specifically, the analysis unit 16 may analyze the process of the person to be analyzed becoming proficient at the operation by analyzing a reduction in operation time in a process of the operator repeating the same operation. In this example, the analysis unit 16 may output the graph L, and analyze the proficiency in operation of the person to be analyzed based on the slope of the graph L.

From only the distribution S1 of operation times shown in FIG. 11, the tendency of change in operation time in the process of an operator repeating the same operation cannot be found out. The operation analysis apparatus 10 according to one or more embodiments can analyze the proficiency in operation of a person to be analyzed by extracting operation times of a specific operator (second group) and clarifying the tendency of change in operation time in the process of the operator repeating the same operation. As a result of the classification unit 15 classifying pieces of operation information, and separating the pieces of operation information based on the body build, the proficiency in task can be analyzed, which is difficult when pieces of operation information of a plurality of operators are collectively analyzed.

Figure 13:
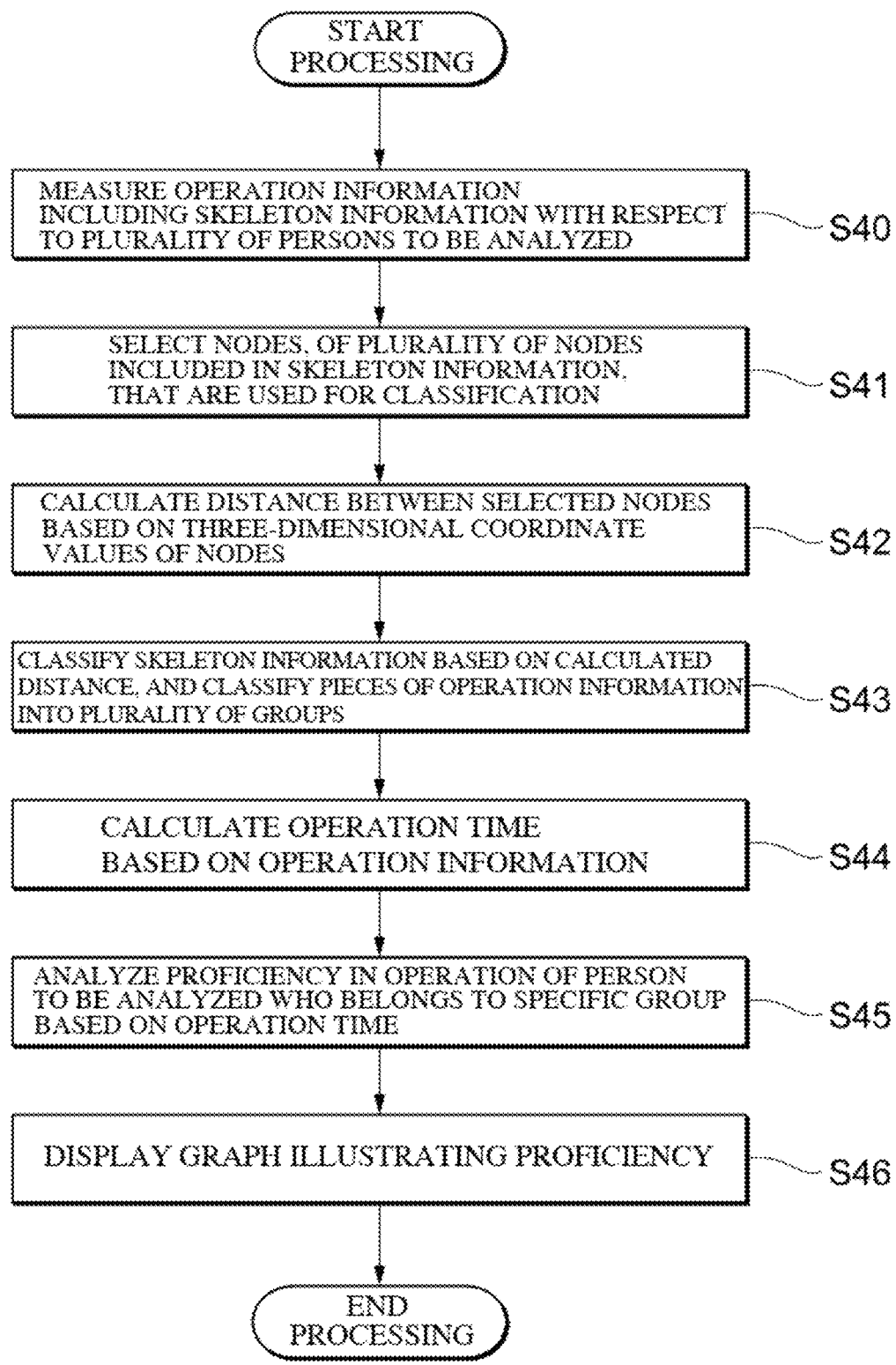
FIG. 13 is a flow diagram illustrating a fourth example of analysis processing executed by an operation analysis system according to one or more embodiments.

FIG. 13 is a flowchart of a fourth example of analysis processing executed by the operation analysis system 100 according to one or more embodiments. First, the first, second, and third image capturing units 20a, 20b, and 20c and the measurement unit 30 measure a plurality of pieces of operation information including skeleton information with respect to a plurality of persons to be analyzed (S40).

The selection unit 17 of the operation analysis apparatus 10 selects nodes, of a plurality of nodes included in the skeleton information, that are used for classification (S41). Thereafter, the classification unit 15 calculates the distance between the selected nodes based on the three-dimensional coordinate values of the nodes (S42). Note that the classification unit 15 may calculate a time average of the distance between the selected nodes based on the three-dimensional coordinate values of the nodes.

The classification unit 15 of the operation analysis apparatus 10 classifies the pieces of skeleton information based on the calculated distances, and classifies the pieces of operation information into a plurality of groups (S43). Then, the analysis unit 16 of the operation analysis apparatus 10 calculates operation times based on pieces of operation information with respect to a specific group (S44), and analyzes the proficiency in operation of a person to be analyzed who belongs to the specific group based on the operation times (S45). Finally, the operation analysis apparatus 10 outputs a graph illustrating the proficiency in the display unit 10f (S46). Note that the graph illustrating the proficiency may be transmitted to an external device. Also, the analysis result of the analysis unit 16 may include numerical values indicating the proficiency.

Figure 14:
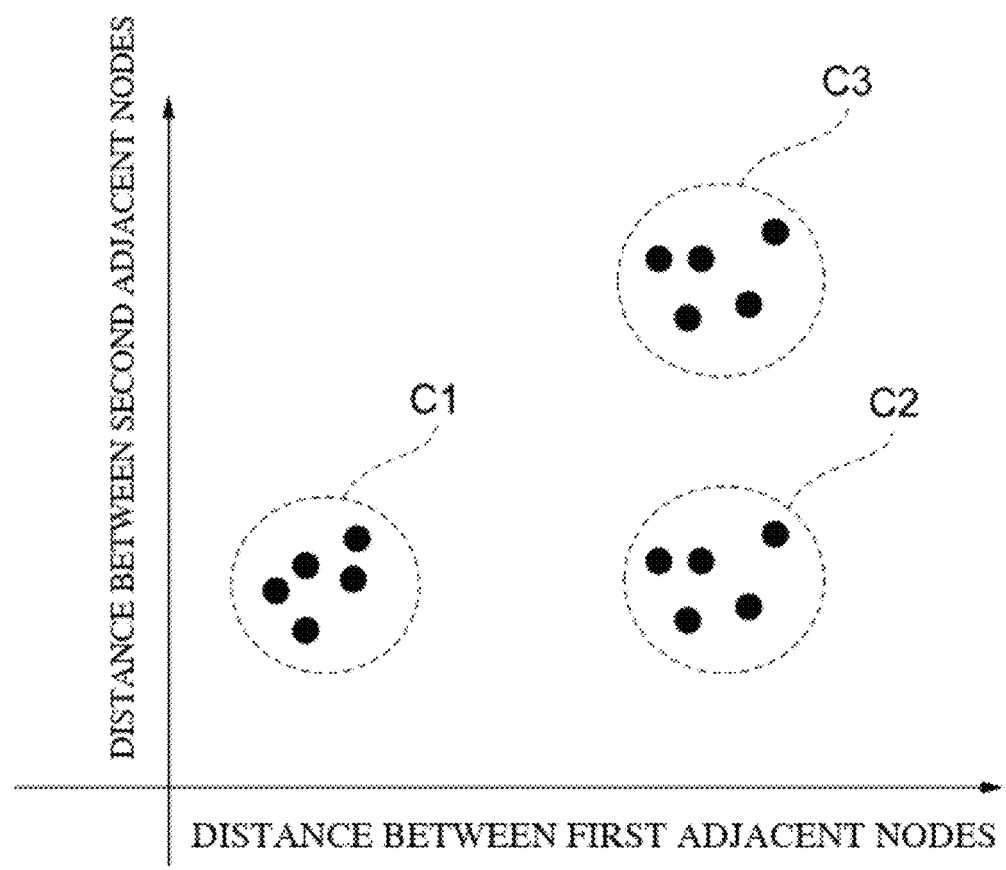
FIG. 14 is a diagram illustrating an example of pieces of operation information regarding a plurality of persons to be analyzed that have been classified into a plurality of groups by an operation analysis apparatus according to one or more embodiments.

FIG. 14 is a diagram illustrating an example of operation information regarding a plurality of persons to be analyzed that have been classified into a plurality of groups by the operation analysis apparatus 10 according to one or more embodiments. In FIG. 14, the horizontal axis shows the distance between the first adjacent nodes, and the vertical axis shows the distance between the second adjacent nodes, and a result is shown that is obtained by the classification unit 15 classifying the plurality of pieces of operation information based on the distance between the first adjacent nodes and the distance between the second adjacent nodes. Here, the first adjacent nodes are two adjacent nodes of a plurality of nodes included in the skeleton information, and the second adjacent nodes are two other adjacent nodes of the plurality of nodes included in the skeleton information. Also, the plurality of points shown in FIG. 14 each represent a piece of operation information.

The classification unit 15 classifies the plurality of pieces of operation information into a first group C1, a second group C2, and a third group C3 by performing classification based on the distance between the first adjacent nodes and the distance between the second adjacent nodes. It can be seen that the classification unit 15 has appropriately classified the plurality of pieces of operation information into the plurality of groups.

If the plurality of pieces of operation information are classified into a plurality of groups based on only the distance between the first adjacent nodes, it is difficult to distinguish between the second group C2 and the third group C3 as different groups. Also, if the plurality of pieces of operation information are classified into a plurality of groups based on only the distance between the second adjacent nodes, it is difficult to distinguish between the second group C1 and the third group C2 as different groups. In the operation analysis apparatus 10 according to one or more embodiments, the classification unit 15 classifies a plurality of pieces of operation information into a plurality of groups using a distance between two adjacent nodes of a plurality of nodes included in the skeleton information and a distance between two other adjacent nodes of the plurality of nodes included in the skeleton information, and as a result, the plurality of pieces of operation information can be classified in detail. As a result of the plurality of pieces of operation information being classified in detail, the operation of a person to be analyzed can be analyzed while accurately recognizing the physical feature of the person to be analyzed.

Note that, in the present example, a case where a plurality of pieces of operation information are classified based on the distance between first adjacent nodes and the distance between second adjacent nodes has been described, but the classification unit 15 may classify the plurality of pieces of operation information based on the distances between any number of adjacent nodes. Also, the classification unit 15 may also classify a plurality of pieces of operation information based on the ratio between the distance between first adjacent nodes and the distance between second adjacent nodes and the ratio between the distance between the first adjacent nodes and the distance between third adjacent nodes. Also, the classification unit 15 may also classify a plurality of pieces of operation information based on the ratio between the distance between first adjacent nodes and a reference distance and the ratio between the distance between second adjacent nodes and the reference distance. Moreover, the classification unit 15 may also classify a plurality of pieces of operation information based on the ratio between the distance between first adjacent nodes and the distance between second adjacent nodes and the ratio between the distance between the first adjacent nodes and a reference distance.

Figure 15:
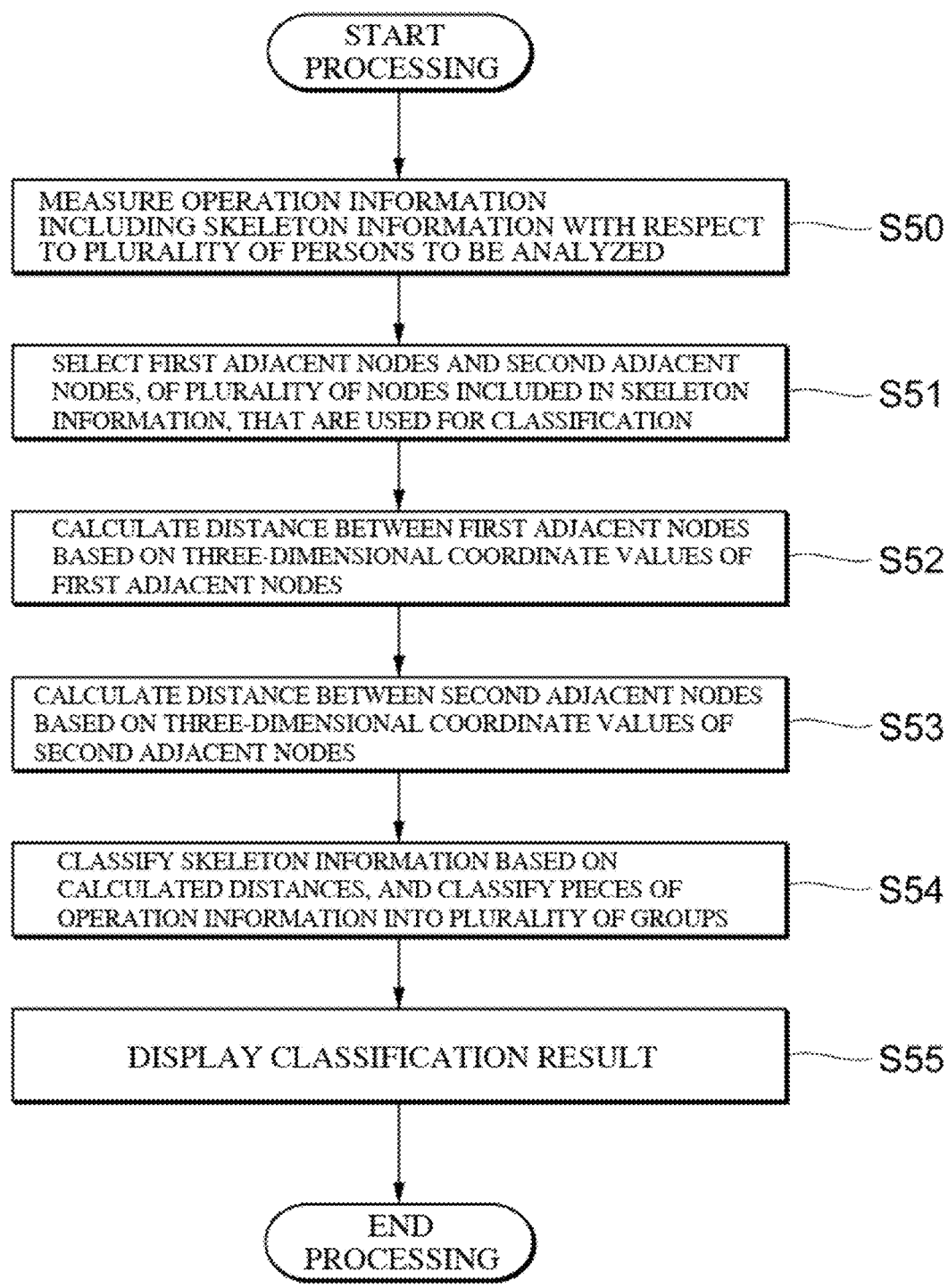
FIG. 15 is a flow diagram illustrating an example of classification processing that is executed by an operation analysis system according to one or more embodiments.

FIG. 15 is a flowchart of an example of classification processing that is executed by the operation analysis apparatus 10 according to one or more embodiments. First, the first, second, and third image capturing units 20a, 20b, and 20c and the measurement unit 30 measure a plurality of pieces of operation information including skeleton information with respect to a plurality of persons to be analyzed (S50).

The selection unit 17 of the operation analysis apparatus 10 selects first adjacent nodes and second adjacent nodes, of a plurality of nodes included in the skeleton information, that are used for classification (S51). Here, the first adjacent nodes are two adjacent nodes of a plurality of nodes included in the skeleton information, and the second adjacent nodes are two other adjacent nodes of the plurality of nodes included in the skeleton information.

Thereafter, the classification unit 15 calculates the distance between the first adjacent nodes based on the three-dimensional coordinate values of the first adjacent nodes (S52), and calculates the distance between the second adjacent nodes based on the three-dimensional coordinate values of the second adjacent nodes (S53).

The classification unit 15 of the operation analysis apparatus 10 classifies pieces of skeleton information based on the calculated distances, and classifies the pieces of operation information into a plurality of groups (S54). Note that the classification unit 15 may classify the pieces of operation information into the plurality of groups using any algorithm such as k-means clustering.

Finally, the operation analysis apparatus 10 displays the classification result of the classification unit 15 in the display unit 10*f* (S55). Note that the classification result may be transmitted to an external device.

4. Modifications

Figure 16:
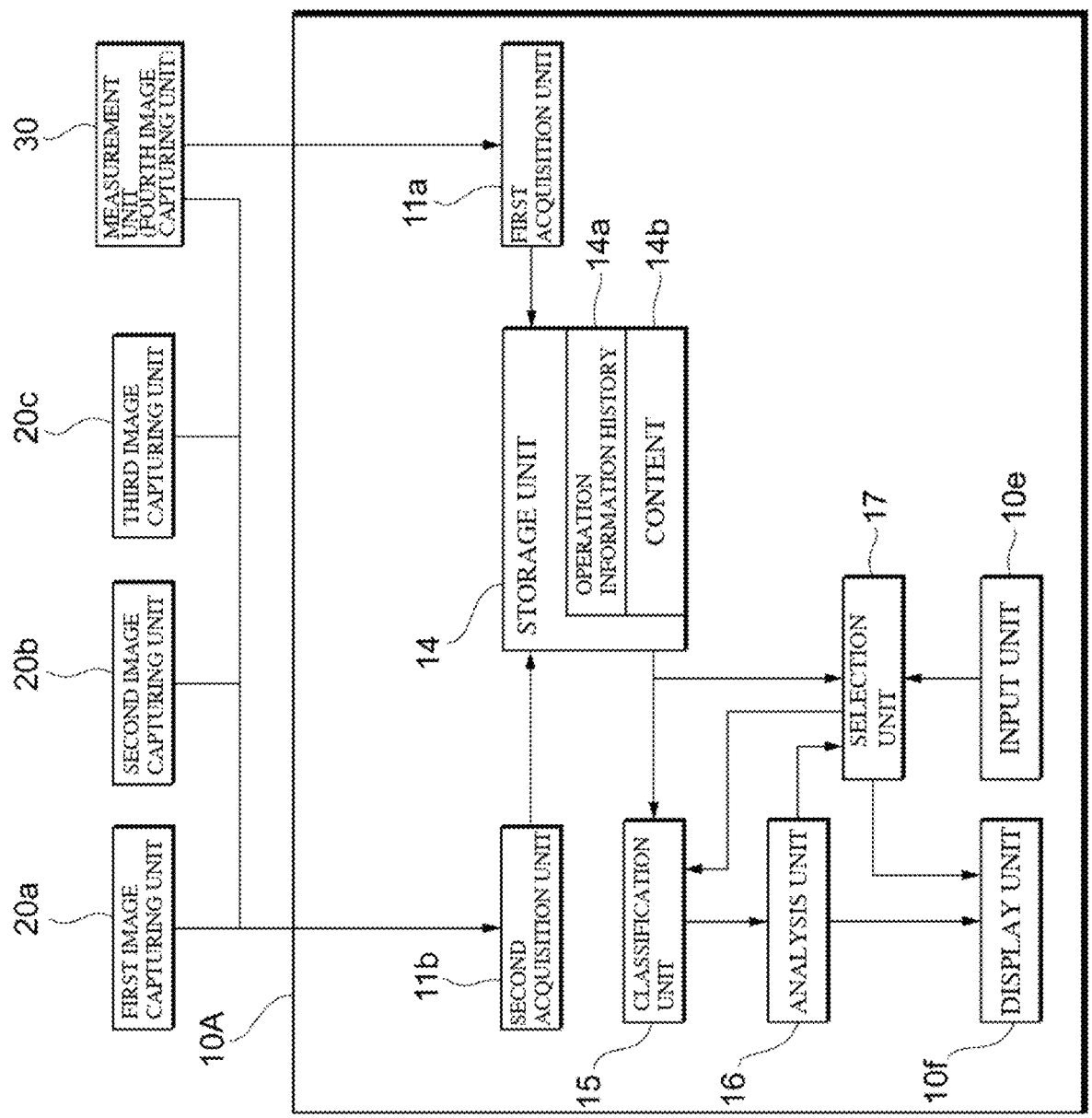
FIG. 16 is a functional block diagram illustrating an operation analysis system according to a first modification of one or more embodiments.

FIG. 16 is a functional block diagram of an operation analysis apparatus 10A according to a modification of one or more embodiments. The operation analysis apparatus 10A according to this modification differs from the operation analysis apparatus 10 according to one or more embodiments in that contents 14*b* are stored in the storage unit 14, and the selection unit 17 may select the contents 14*b* corresponding to a person to be analyzed based on the analysis result of the analysis unit 16. The other configurations of the operation analysis apparatus 10A according to this modification are similar to those of the operation analysis apparatus 10 according to one or more embodiments.

The contents 14*b* may be any information such as a moving image, an image, or a text, and may be a moving image showing an operation that serves as a model, or information regarding an instrument for making an operation smooth.

For example, if the analysis result of the analysis unit 16 is a result obtained by analyzing whether or not an anomaly is present in an operation of a person to be analyzed, the selection unit 17 may select a moving image showing an operation that serves as a model with respect to the operation that has been analyzed to include an anomaly, as the contents 14*b*. Also, if the analysis result of the analysis unit 16 is a result obtained by analyzing the proficiency in operation of a person to be analyzed, for example, the selection unit 17 may select an moving image showing an operation that serves as a model, the contents of the moving image being different depending on the proficiency level, or information regarding a tool and an instrument that are different depending on the proficiency level, as the contents 14*b*.

In this way, improvement in operation of a person to be analyzed can be accelerated by recommending, based on the analysis result, contents regarding an instrument that the person to be analyzed should refer to, and by recommending contents regarding operations that the person to be analyzed should refer to.

Note that the selection unit 17 may select, based on the analysis result of the analysis unit 16, a moving image showing a non-standard operation, or information regarding an inappropriate instrument, as the contents 14*b*. With this, operators are notified of what types of mistakes have occurred, and can be prevented from making mistakes.

Figure 17:
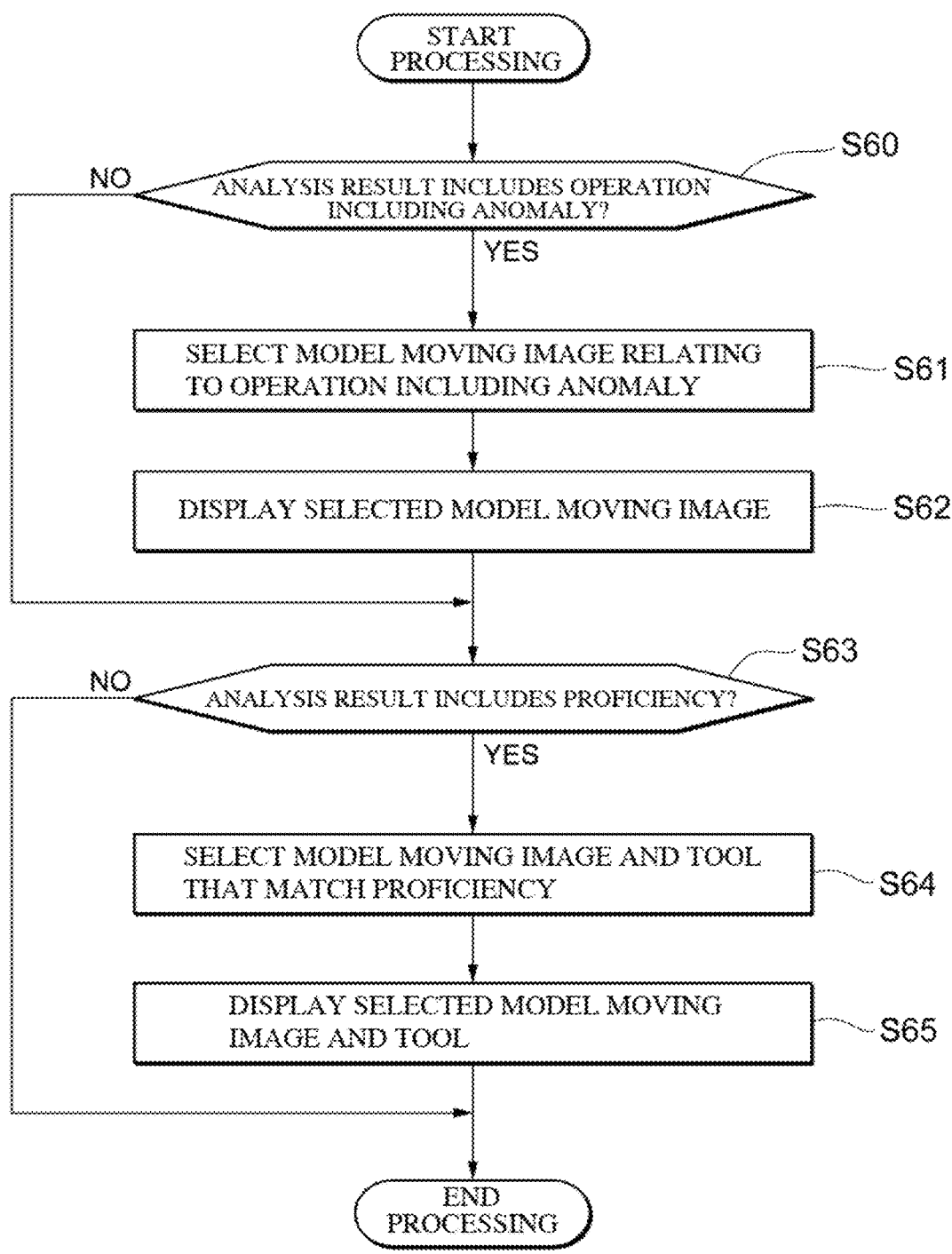
FIG. 17 is a flow diagram illustrating an example of analysis processing that is executed by an operation analysis system according to a first modification of one or more embodiments.

FIG. 17 is a flowchart of an example of analysis processing that is executed by the operation analysis apparatus 10A according to this modification. The processing shown in FIG. 17 is executed after the analysis result of the analysis unit 16 has been obtained.

If the analysis result of the analysis unit 16 includes information regarding an operation, of a person to be analyzed, that includes an anomaly (S60; YES), the selection unit 17 of the operation analysis apparatus 10A searches the storage unit 14, and selects a model moving image relating to the operation including an anomaly (S61). Then, the operation analysis apparatus 10A displays the selected model moving image in the display unit 10*f* (S62). Note that the selected model moving image may be transmitted to an external device.

If the analysis result of the analysis unit 16 includes information regarding the proficiency in operation of a person to be analyzed (S63; YES), the selection unit 17 of the operation analysis apparatus 10A searches the storage unit 14, and selects information regarding a model moving image and tool that match the proficiency (S64). Then, the operation analysis apparatus 10A displays the information regarding the selected model moving image and tool in the display unit 10*f* (S65). Note that the information regarding the selected model moving image and tool may be transmitted to an external device.

Embodiments described above are for the purpose of facilitating understanding of the present invention, and are not to be interpreted as limiting the present invention. Constituent elements of embodiments and arrangement, materials, conditions, shapes and sizes thereof are not limited to those exemplified, and can be changed as appropriate. In addition, configurations described in different embodiments can be partially substituted or combined.

One or more embodiments can also be described as in the following notes. Note that one or more embodiments are not limited to the modes described in the following notes. Also, one or more embodiments may be a mode obtained by replacing descriptions between notes or combining descriptions.

Note 1

An operation analysis apparatus (10) including:

an acquisition unit (11) configured to acquire a plurality of pieces of operation information indicating operations of a plurality of persons to be analyzed;

a classification unit (15) configured to classify the plurality of pieces of operation information into a plurality of groups; and an analysis unit (16) configured to analyze the operations of the persons to be analyzed based on the pieces of operation information that have been classified into the plurality of groups, wherein the plurality of pieces of operation information each include skeleton information that indicates positions of a plurality of body parts that are associated with the skeleton of each of the plurality of persons to be analyzed, and the classification unit (15) classifies the plurality of pieces of operation information using the skeleton information included in the operation information.

Note 2

The operation analysis apparatus (10) according to Note 1, wherein the classification unit (15) classifies the plurality of pieces of operation information into the plurality of groups based on a difference between the skeleton information included in one operation information of the plurality of pieces of operation information and the skeleton information included in another operation information of the plurality of pieces of operation information.

Note 3

The operation analysis apparatus (10) according to Note 1, wherein the classification unit (15) classifies the plurality of pieces of operation information into the plurality of groups based on a difference between the skeleton information included in the operation information and a predetermined reference information.

Note 4

The operation analysis apparatus (10) according to any one of Notes 1 to 3, wherein the skeleton information includes coordinate values of a plurality of nodes corresponding to the plurality of parts, and the classification unit (15) classifies the plurality of pieces of operation information into the plurality of groups by performing classification based on a distance between the plurality of nodes that is calculated based on the coordinate values.

Note 5

The operation analysis apparatus (10) according to Note 4, wherein the classification unit (15) classifies the plurality of pieces of operation information into the plurality of groups by performing classification based on a distance between two adjacent nodes of the plurality of nodes.

Note 6

The operation analysis apparatus (10) according to Note 4 or 5, wherein the classification unit (15) classifies the plurality of pieces of operation information into the plurality of groups based on a ratio between a distance between two adjacent nodes of the plurality of nodes and a distance between two other adjacent nodes of the plurality of nodes.

Note 7

The operation analysis apparatus (10) according to any one of Notes 4 to 6, wherein the classification unit (15) classifies the plurality of pieces of operation information into the plurality of groups based on a ratio between a distance between a plurality of nodes and a reference distance that is acquired by the acquisition unit (11) along with the plurality of pieces of operation information.

Note 8

The operation analysis apparatus (10) according to any one of Notes 4 to 7, wherein the coordinate values include three-dimensional coordinate values, and the classification unit (15) classifies the plurality of pieces of operation information into the plurality of groups based on the distance between a plurality of nodes that is calculated based on the three-dimensional coordinate values.

Note 9

The operation analysis apparatus (10) according to any one of Notes 4 to 8, wherein the coordinate values are associated with time instants at which the coordinate values are measured, and the classification unit (15) classifies the plurality of pieces of operation information into the plurality of groups based on an average distance between the plurality of nodes that is calculated based on the plurality of coordinate values that are measured at different time instants.

Note 10

The operation analysis apparatus (10) according to any one of Notes 1 to 9, further including a selection unit (17) configured to select a plurality of parts, of the plurality of parts, that are used for classification performed by the classification unit (15).

Note 11

The operation analysis apparatus (10) according to Note 10, wherein the selection unit (17) selects each of a plurality of parts that are used for classification performed by the classification unit (15) based on whether or not the part is acquired from the plurality of persons to be analyzed in common.

Note 12

The operation analysis apparatus (10) according to Note 10, wherein the selection unit (17) selects parts that are used for classification performed by the classification unit (15) based on comparison between a distance between two adjacent parts of the plurality of parts and a distance between two other adjacent parts of the plurality of parts.

Note 13

The operation analysis apparatus (10) according to any one of Notes 10 to 12, wherein the selection unit (17) selects a content for the person to be analyzed based on an analysis result of the analysis unit (16).

Note 14

The operation analysis apparatus (10) according to any one of Notes 1 to 13, wherein the analysis unit (16) analyzes whether or not an anomaly is included in an operation of the person to be analyzed based on a feature amount that is calculated based on the operation information and represents a feature of the operation of the person to be analyzed.

Note 15

The operation analysis apparatus (10) according to any one of Notes 1 to 14, wherein the analysis unit (16) analyzes proficiency in an operation of the person to be analyzed based on a feature amount that is calculated based on the operation information and represents a feature of the operation of the person to be analyzed.

Note 16

The operation analysis apparatus (10) according to Note 14 or 15, wherein the feature amount includes at least one of a length of a locus of a specific part of the person to be analyzed and an operation time of the person to be analyzed.

Note 17

An operation analysis method including:

acquiring a plurality of pieces of operation information indicating operations of a plurality of persons to be analyzed;

classifying the plurality of pieces of operation information into a plurality of groups; and analyzing the operations of the persons to be analyzed based on the pieces of operation information that have been classified into the plurality of groups, wherein the plurality of pieces of operation information each include skeleton information that indicates positions of a plurality of body parts that are associated with the skeleton of each of the plurality of persons to be analyzed, and the classifying includes classifying the plurality of pieces of operation information using the skeleton information included in the operation information.

Note 18

An operation analysis program for causing a computation unit included in an operation analysis apparatus (10) to function as:

an acquisition unit (11) configured to acquire a plurality of pieces of operation information indicating operations of a plurality of persons to be analyzed;

a classification unit (15) configured to classify the plurality of pieces of operation information into a plurality of groups; and an analysis unit (16) configured to analyze the operations of the persons to be analyzed based on the pieces of operation information that have been classified into the plurality of groups, wherein the plurality of pieces of operation information each include skeleton information that indicates positions of a plurality of body parts that are associated with the skeleton of each of the plurality of persons to be analyzed, and the classification unit (15) classifies the plurality of pieces of operation information using the skeleton information included in the operation information.

Note 19

A operation analysis system including:

a measurement unit (30) configured to acquire a plurality of pieces of operation information indicating operations of a plurality of persons to be analyzed;

a classification unit (15) configured to classify the plurality of pieces of operation information into a plurality of groups;

an analysis unit (16) configured to analyze the operations of the persons to be analyzed based on the pieces of operation information that have been classified into the plurality of groups; and a display unit (100 configured to display an analysis result of the analysis unit (16), wherein the plurality of pieces of operation information each include skeleton information that indicates positions of a plurality of body parts that are associated with the skeleton of each of the plurality of persons to be analyzed, and the classification unit (15) classifies the plurality of pieces of operation information using the skeleton information included in the operation information.

INDEX TO THE REFERENCE NUMERALS

10 Operation analysis apparatus
10A Operation analysis apparatus according to modification
10a CPU
10b RAM
10c ROM
10d Communication unit
10e Input unit
10f Display unit
11 Acquisition unit
11a First acquisition unit
11b Second acquisition unit
11c Third acquisition unit
14 Storage unit
14a Operation information history
14b Content
15 Classification unit
16 Analysis unit
17 Selection unit
20a First image capturing unit
20b Second image capturing unit
20c Third image capturing unit
30 Measurement unit
100 Operation analysis system
A1 First operator
A2 Second operator
C1 First group
C2 Second group
C3 Third group
D1 First data
D1a First data of first group
D1b First data of second group
D2 Second data
G1 Histogram of task time
G2 Histogram according to analysis result
L Graph according to analysis result
L1 Distance between first adjacent nodes
L2 Distance between second adjacent nodes
N1 First node
N2 Second node
N3 Third node
N4 Fourth node
P1 Example of operation information
R Operation region
S Circle
S1 Distribution of operation time
S2 Operation time of third operator

The invention claimed is:

1. An operation analysis apparatus comprising a processor configured with a program to perform operations comprising:

operation as an acquisition unit configured to acquire a plurality of pieces of operation information indicating operations of a plurality of persons to be analyzed;

operation as a classification unit configured to classify the plurality of pieces of operation information into a plurality of groups; and operation as an analysis unit configured to analyze the operations of the plurality of persons to be analyzed based on the plurality of pieces of operation information that have been classified into the plurality of groups, wherein the plurality of pieces of operation information each include skeleton information that indicates positions of a plurality of body parts that are associated with a skeleton of each of the plurality of persons to be analyzed, the processor is configured with the program to perform operations to cause operation as the classification unit to classify the plurality of pieces of operation information using the skeleton information included in the operation information, the skeleton information comprises coordinate values of a plurality of nodes corresponding to the plurality of body parts, the processor is configured with the program to perform operations to cause operation as the classification unit to classify the plurality of pieces of operation information into the plurality of groups by performing classification based on a distance between the plurality of nodes that is calculated based on the coordinate values, the coordinate values are associated with time instants at which the coordinate values are measured, and the processor is configured with the program to perform operations to cause operation as the classification unit to classify the plurality of pieces of operation information into the plurality of groups based on an average distance between the plurality of nodes that is calculated based on a plurality of the coordinate values that are measured at different time instants.

2. The operation analysis apparatus according to claim 1, wherein the processor is configured with the program to perform operations comprising operations to cause operation as the classification unit to classify the plurality of pieces of operation information into the plurality of groups based on a difference between the skeleton information included in one operation information of the plurality of pieces of operation information and the skeleton information included in another operation information of the plurality of pieces of operation information.

3. The operation analysis apparatus according to claim 1, wherein the processor is configured with the program to perform operations comprising operations to cause operation as the classification unit to classify the plurality of pieces of operation information into the plurality of groups based on a difference between the skeleton information included in the operation information and a predetermined reference information.

4. The operation analysis apparatus according to claim 1, wherein the processor is configured with the program to perform operations comprising operations to cause operation as the classification unit to classify the plurality of pieces of operation information into the plurality of groups by performing classification based on a distance between two adjacent nodes of the plurality of nodes.

5. The operation analysis apparatus according to claim 1, wherein the processor is configured with the program to perform operations comprising operations to cause operation as the classification unit to classify the plurality of pieces of operation information into the plurality of groups based on a ratio between a distance between two adjacent nodes of the plurality of nodes and a distance between two other adjacent nodes of the plurality of nodes.

6. The operation analysis apparatus according to claim 1, wherein the processor is configured with the program to perform operations comprising operations to cause operation as the classification unit to classify the plurality of pieces of operation information into the plurality of groups based on a ratio between a distance between a plurality of nodes and a reference distance that is acquired by the acquisition unit along with the plurality of pieces of operation information.

7. The operation analysis apparatus according to claim 1, wherein
the coordinate values comprise three-dimensional coordinate values, and
the processor is configured with the program to perform operations comprising operations to cause operation as the classification unit to classify the plurality of pieces of operation information into the plurality of groups based on the distance between a plurality of nodes that is calculated based on the three-dimensional coordinate values.

8. The operation analysis apparatus according to claim 1, wherein the processor is configured with the program to perform operations further comprising operation as a selection unit configured to select a plurality of parts, of the plurality of body parts, that are used for classification performed by the classification unit.

9. The operation analysis apparatus according to claim 8, wherein the processor is configured with the program to perform operations comprising operations to cause operation as the selection unit to select each of a plurality of parts that are used for classification performed by the classification unit based on whether or not the part is acquired from all of the plurality of persons to be analyzed.

10. The operation analysis apparatus according to claim 8, wherein the processor is configured with the program to perform operations comprising operations to cause operation as the selection unit to select parts that are used for classification performed by the classification unit based on a comparison between a distance between two adjacent parts of the plurality of parts and a distance between two other adjacent parts of the plurality of parts.

11. The operation analysis apparatus according to claim 8, wherein the processor is configured with the program to perform operations comprising operations to cause operation as the selection unit to select a content for the person to be analyzed based on an analysis result of the analysis unit.

12. The operation analysis apparatus according to claim 1, wherein the processor is configured with the program to perform operations comprising operations to cause operation as the analysis unit to analyze whether or not an anomaly is included in an operation of the person to be analyzed based on a feature amount that is calculated based on the operation information and represents a feature of the operation of the person to be analyzed.

13. The operation analysis apparatus according to claim 1, wherein the processor is configured with the program to perform operations comprising operations to cause operation as the analysis unit to analyze proficiency in an operation of the person to be analyzed based on a feature amount that is calculated based on the operation information and represents a feature of the operation of the person to be analyzed.

14. The operation analysis apparatus according to claim 12, wherein the feature amount comprises at least one of a length of a locus of a specific part of the person to be analyzed and an operation time of the person to be analyzed.

15. An operation analysis method comprising:
acquiring a plurality of pieces of operation information indicating operations of a plurality of persons to be analyzed;
classifying the plurality of pieces of operation information into a plurality of groups; and
analyzing the operations of the plurality of persons to be analyzed based on the plurality of pieces of operation information that have been classified into the plurality of groups, wherein
the plurality of pieces of operation information each include skeleton information that indicates positions of a plurality of body parts that are associated with a skeleton of each of the plurality of persons to be analyzed,
the classifying comprises classifying the plurality of pieces of operation information using the skeleton information included in the operation information,
the skeleton information comprises coordinate values of a plurality of nodes corresponding to the plurality of body parts,
the classifying further comprises classifying the plurality of pieces of operation information into the plurality of groups by performing classification based on a distance between the plurality of nodes that is calculated based on the coordinate values,
the coordinate values are associated with time instants at which the coordinate values are measured, and
the classifying further comprises classifying the plurality of pieces of operation information into the plurality of groups based on an average distance between the plurality of nodes that is calculated based on a plurality of the coordinate values that are measured at different time instants.

16. A non-transitory computer-readable storage medium storing an operation analysis program, which when read and executed, causes a computation unit included in an operation analysis apparatus to perform operations comprising:
operation as an acquisition unit configured to acquire a plurality of pieces of operation information indicating operations of a plurality of persons to be analyzed;
operation as a classification unit configured to classify the plurality of pieces of operation information into a plurality of groups; and
operation as an analysis unit configured to analyze the operations of the plurality of persons to be analyzed based on the plurality of pieces of operation information that have been classified into the plurality of groups, wherein
the plurality of pieces of operation information each include skeleton information that indicates positions of a plurality of body parts that are associated with a skeleton of each of the plurality of persons to be analyzed,
operation as the classification unit is configured to classify the plurality of pieces of operation information using the skeleton information included in the operation information,
the skeleton information comprises coordinate values of a plurality of nodes corresponding to the plurality of body parts,
operation as the classification unit comprises classifying the plurality of pieces of operation information into the plurality of groups by performing classification based on a distance between the plurality of nodes that is calculated based on the coordinate values, the coordinate values are associated with time instants at which the coordinate values are measured, and operation as the classification unit comprises classifying the plurality of pieces of operation information into the plurality of groups based on an average distance between the plurality of nodes that is calculated based on a plurality of the coordinate values that are measured at different time instants.

17. An operation analysis system comprising:

a processor configured with a program to perform operations comprising:

operation as a measurement unit configured to acquire a plurality of pieces of operation information indicating operations of a plurality of persons to be analyzed;

operation as a classification unit configured to classify the plurality of pieces of operation information into a plurality of groups; and operation as an analysis unit configured to analyze the operations of the plurality of persons to be analyzed based on the plurality of pieces of operation information that have been classified into the plurality of groups; and a display unit configured to display an analysis result of the analysis unit, wherein the plurality of pieces of operation information each include skeleton information that indicates positions of a plurality of body parts that are associated with a skeleton of each of the plurality of persons to be analyzed, the processor is configured with the program to perform operations comprising operations to cause operation as the classification unit to classify the plurality of pieces of operation information using the skeleton information included in the operation information, the skeleton information comprises coordinate values of a plurality of nodes corresponding to the plurality of body parts, the processor is configured with the program to perform operations to cause operation as the classification unit to classify the plurality of pieces of operation information into the plurality of groups by performing classification based on a distance between the plurality of nodes that is calculated based on the coordinate values, the coordinate values are associated with time instants at which the coordinate values are measured, and the processor is configured with the program to perform operations to cause operation as the classification unit to classify the plurality of pieces of operation information into the plurality of groups based on an average distance between the plurality of nodes that is calculated based on a plurality of the coordinate values that are measured at different time instants.

* * * * *